United States Patent
Miyano

(10) Patent No.: US 8,164,834 B2
(45) Date of Patent: Apr. 24, 2012

(54) OBJECTIVE LENS FOR ENDOSCOPE AND ENDOSCOPE

(75) Inventor: Hitoshi Miyano, Saitama (JP)

(73) Assignee: FUJIFILM Corporation, Tokyo (JP)

(*) Notice: Subject to any disclaimer, the term of this patent is extended or adjusted under 35 U.S.C. 154(b) by 101 days.

(21) Appl. No.: 12/788,734

(22) Filed: May 27, 2010

(65) Prior Publication Data

US 2010/0305405 A1     Dec. 2, 2010

(30) Foreign Application Priority Data

May 29, 2009  (JP) ................... 2009-130377

(51) Int. Cl.
- *G02B 21/02*    (2006.01)
- *G02B 9/34*     (2006.01)
- *A61B 1/06*     (2006.01)

(52) U.S. Cl. ............ 359/660; 359/781; 600/176

(58) Field of Classification Search .......... 359/656, 359/659, 660, 753, 781, 783; 600/160, 176
See application file for complete search history.

(56) References Cited

U.S. PATENT DOCUMENTS

| | | | | |
|---|---|---|---|---|
| 6,333,826 | B1* | 12/2001 | Charles | 359/725 |
| 6,595,916 | B2* | 7/2003 | Minami et al. | 600/167 |
| 7,834,907 | B2* | 11/2010 | Kawai | 348/208.4 |
| 7,907,352 | B2* | 3/2011 | Miyano | 359/754 |
| 2008/0249367 | A1 | 10/2008 | Miyano | |
| 2009/0086017 | A1* | 4/2009 | Miyano | 348/65 |

FOREIGN PATENT DOCUMENTS

| JP | 2007-249189 A | 9/2007 |
|---|---|---|
| JP | 2008-152210 A | 7/2008 |

* cited by examiner

*Primary Examiner* — David N Spector
(74) *Attorney, Agent, or Firm* — Sughrue Mion, PLLC

(57) ABSTRACT

In an objective lens for an endoscope, the full angle of view exceeds 120 degrees, and a most-object-side surface of the objective lens is spherical. Further, the following condition formulas (1) and (2) are satisfied:

$$0.7 < \theta 8/\theta 10 < 0.8 \quad (1); \text{ and}$$

$$5 < R_1/f < 15 \quad (2),$$

where $\theta 10$: half angle of view corresponding to a maximum image height;
$\theta 8$: half angle of view corresponding to an image height that is 80% of the maximum image height;
$R_1$: curvature radius of the most-object-side surface; and
f: focal length of the entire system of the objective lens.

6 Claims, 26 Drawing Sheets

FIG.1  EXAMPLE 1
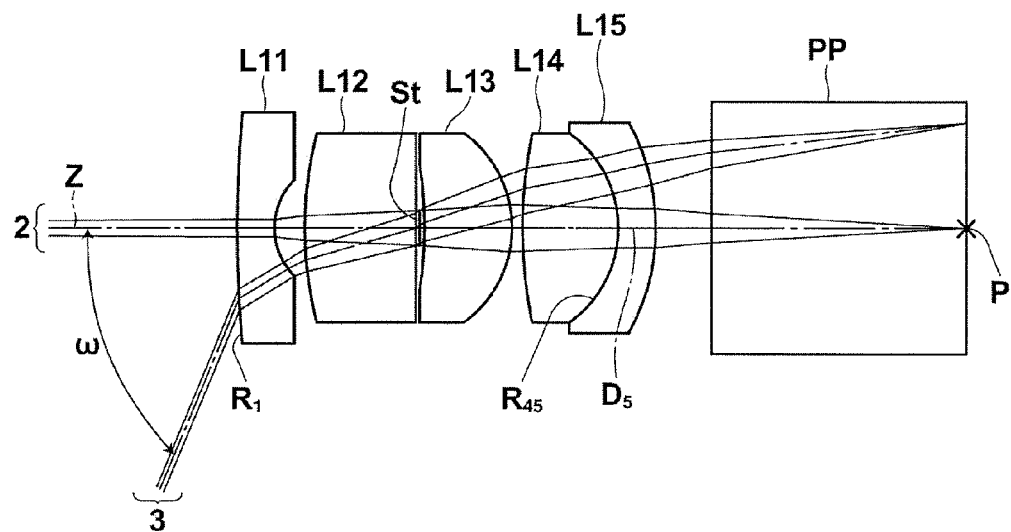
FIG.2  EXAMPLE 2
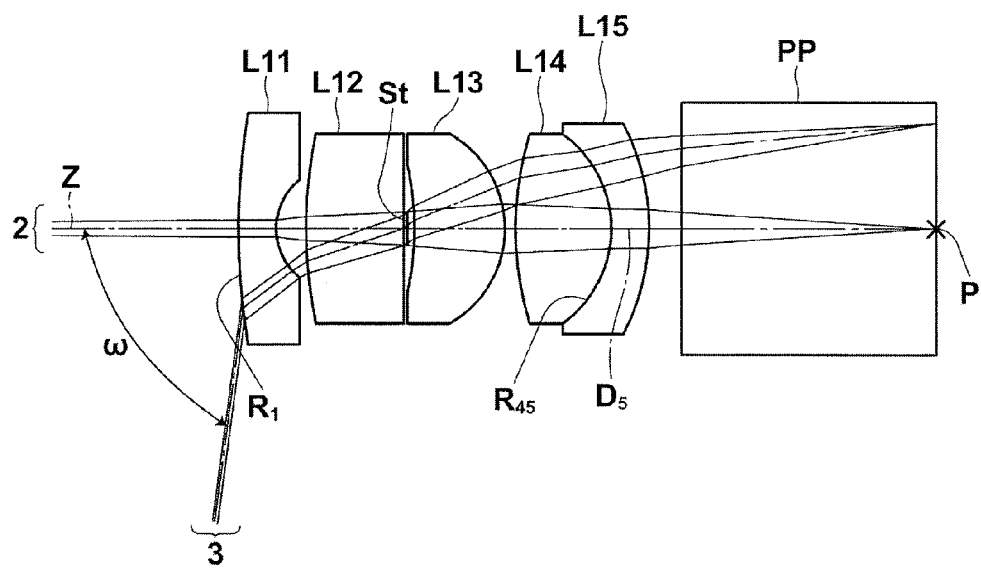

FIG.3  EXAMPLE 3
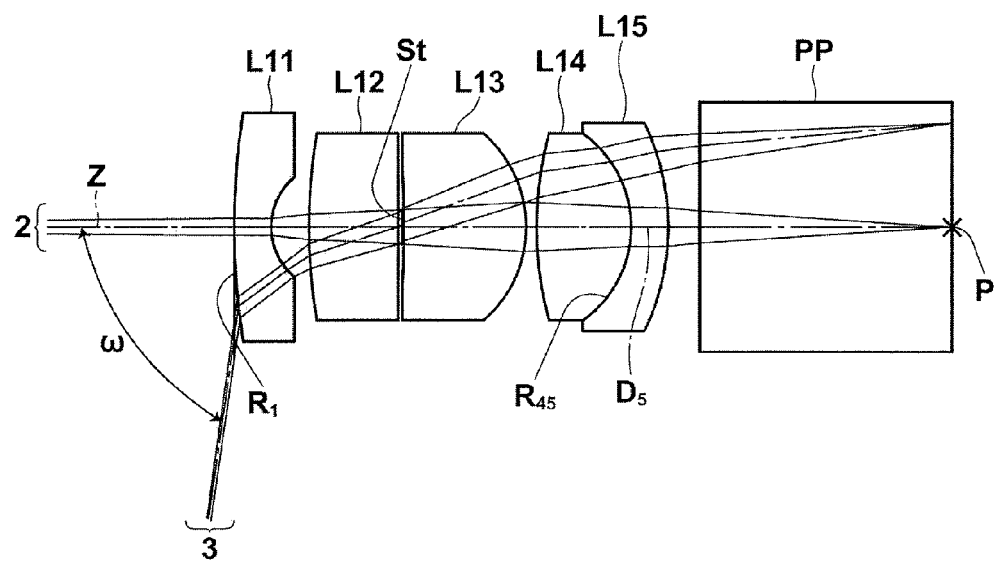
FIG.4  EXAMPLE 4
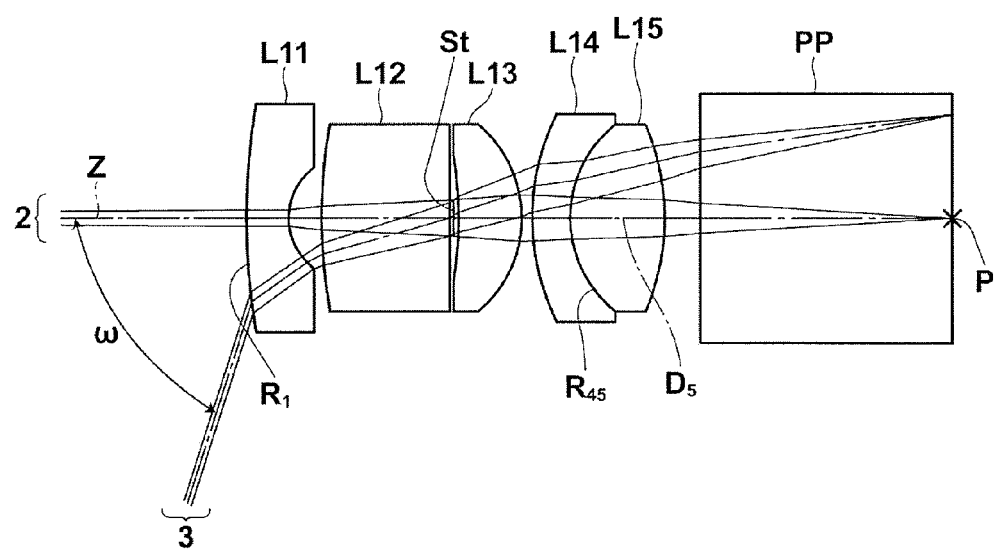

FIG.5   EXAMPLE 5
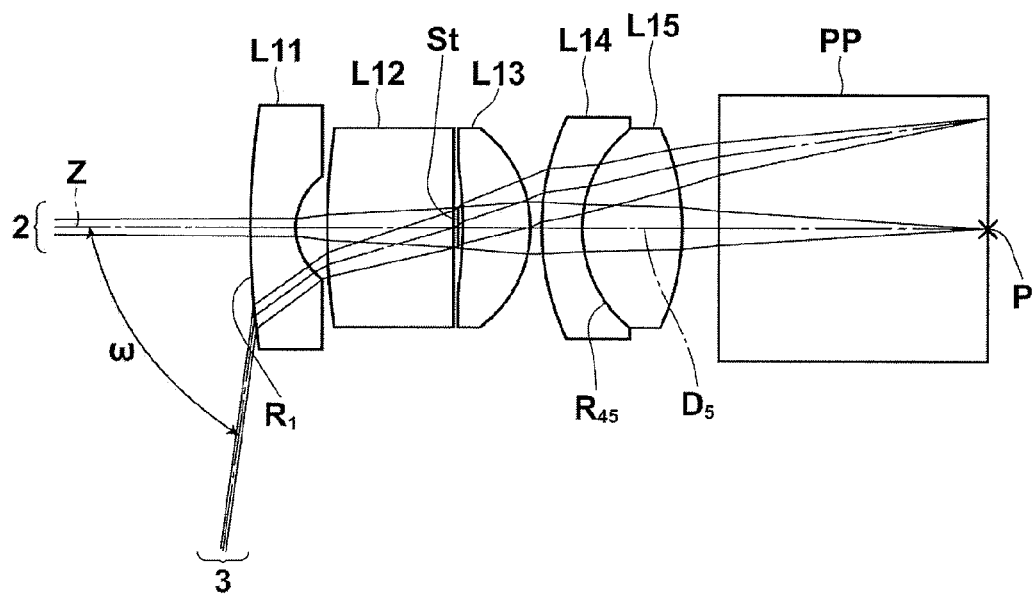
FIG.6   EXAMPLE 6
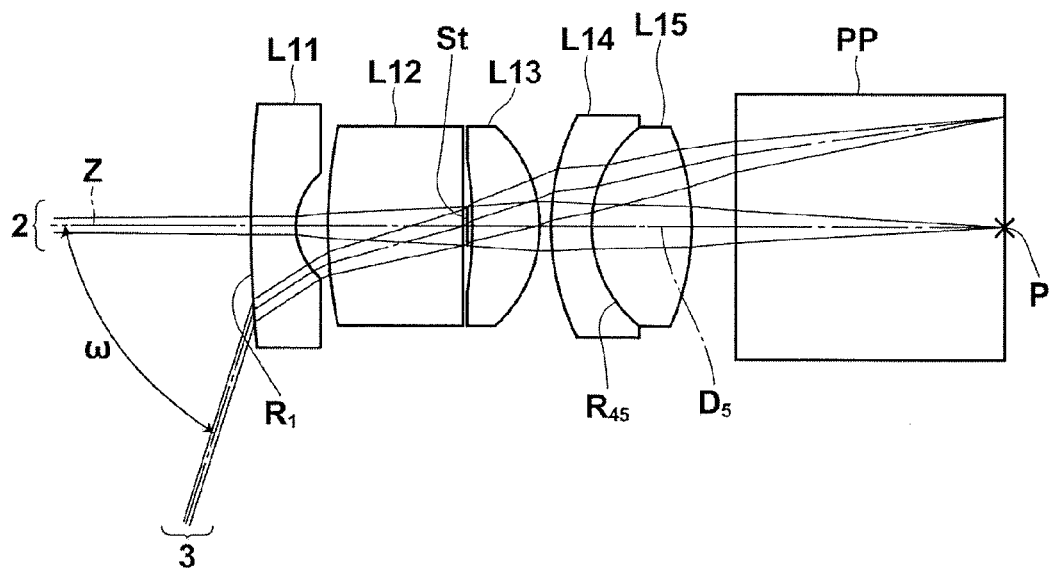

FIG.7 EXAMPLE 7
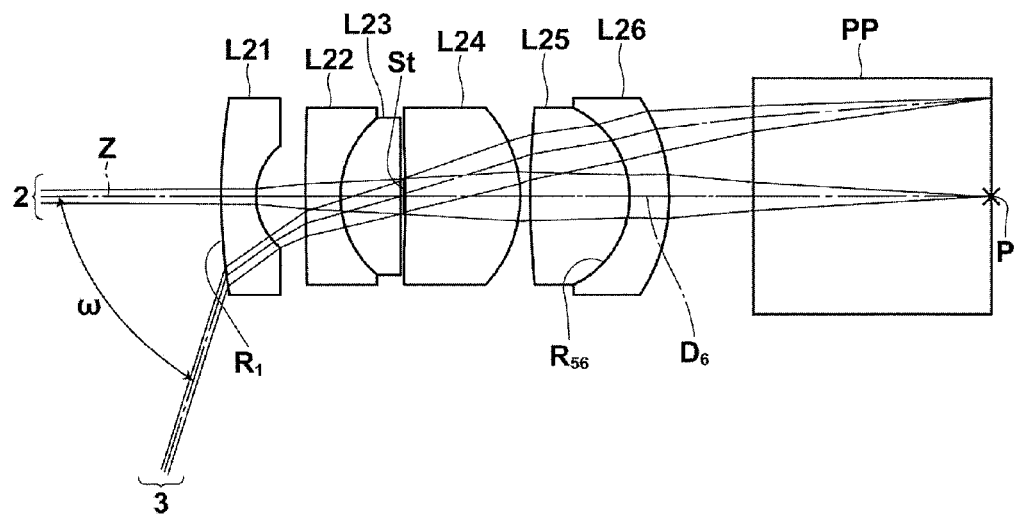
FIG.8 EXAMPLE 8
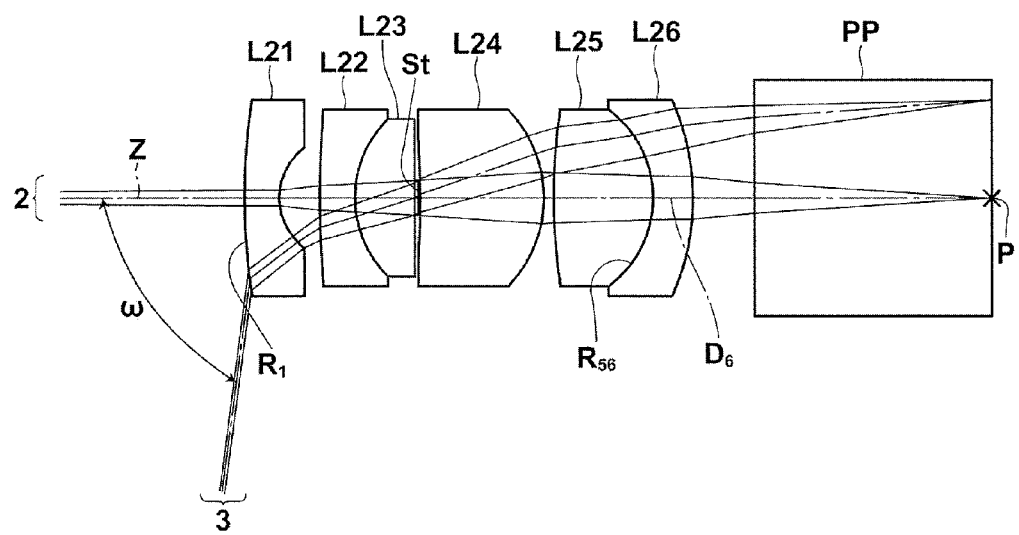

FIG.9 EXAMPLE 9
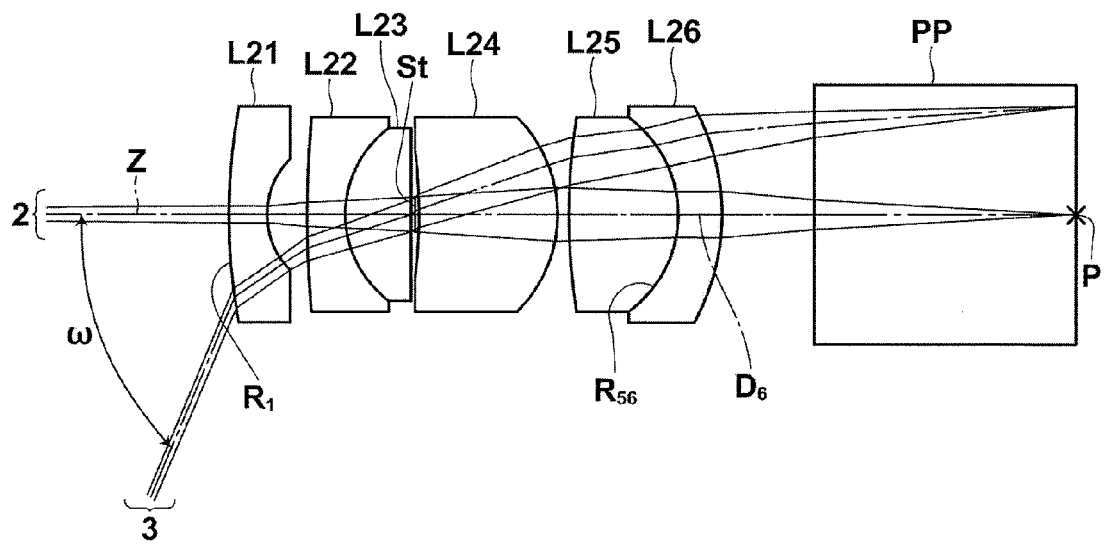
FIG.10 EXAMPLE 10
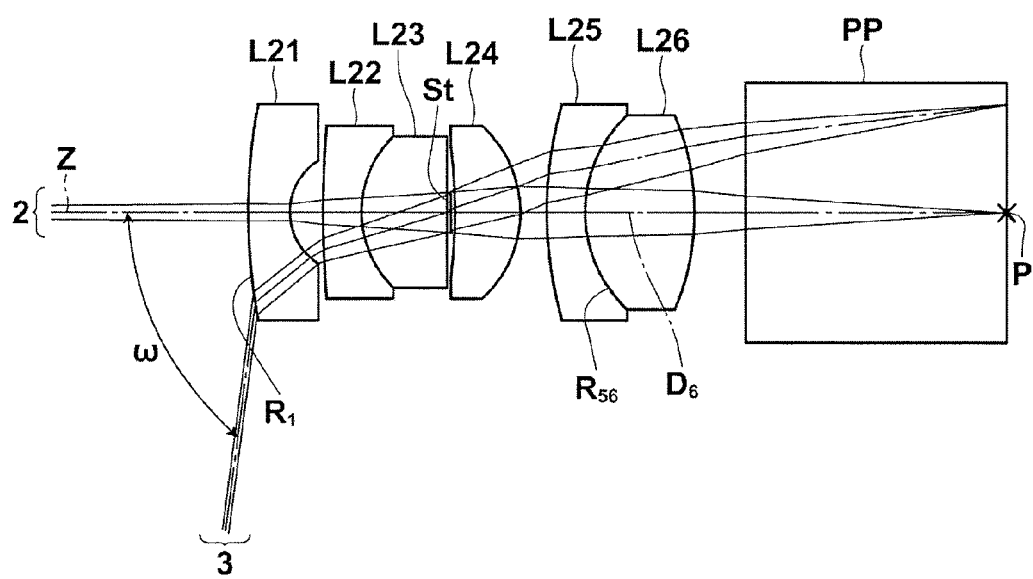

FIG.11  EXAMPLE 11
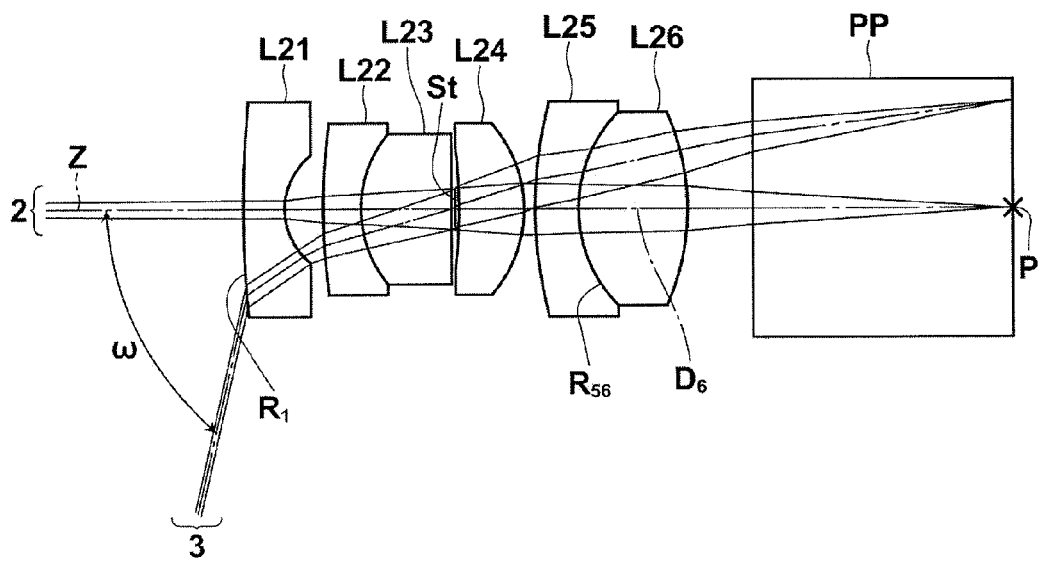
FIG.12  EXAMPLE 12
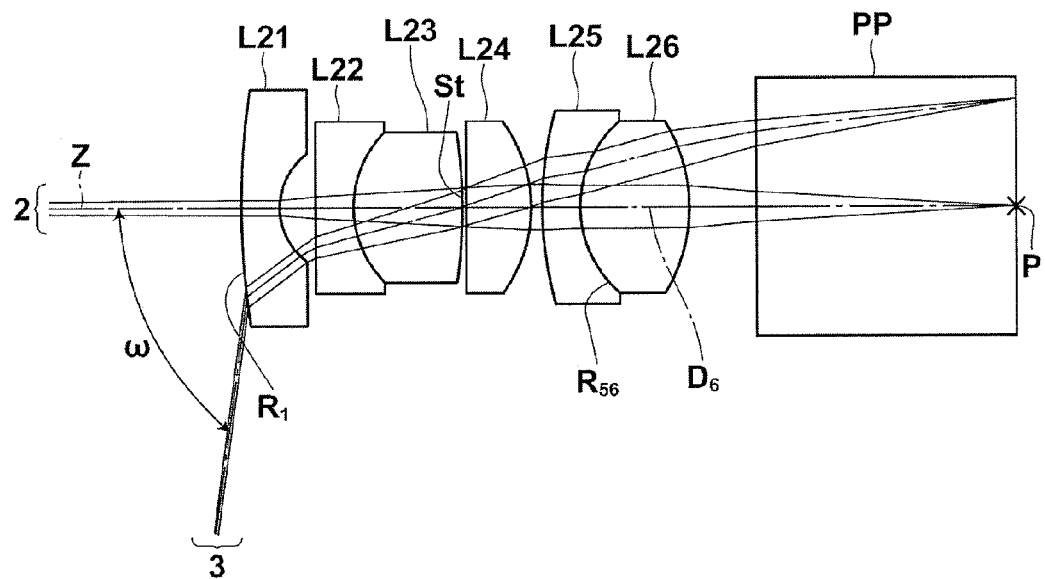

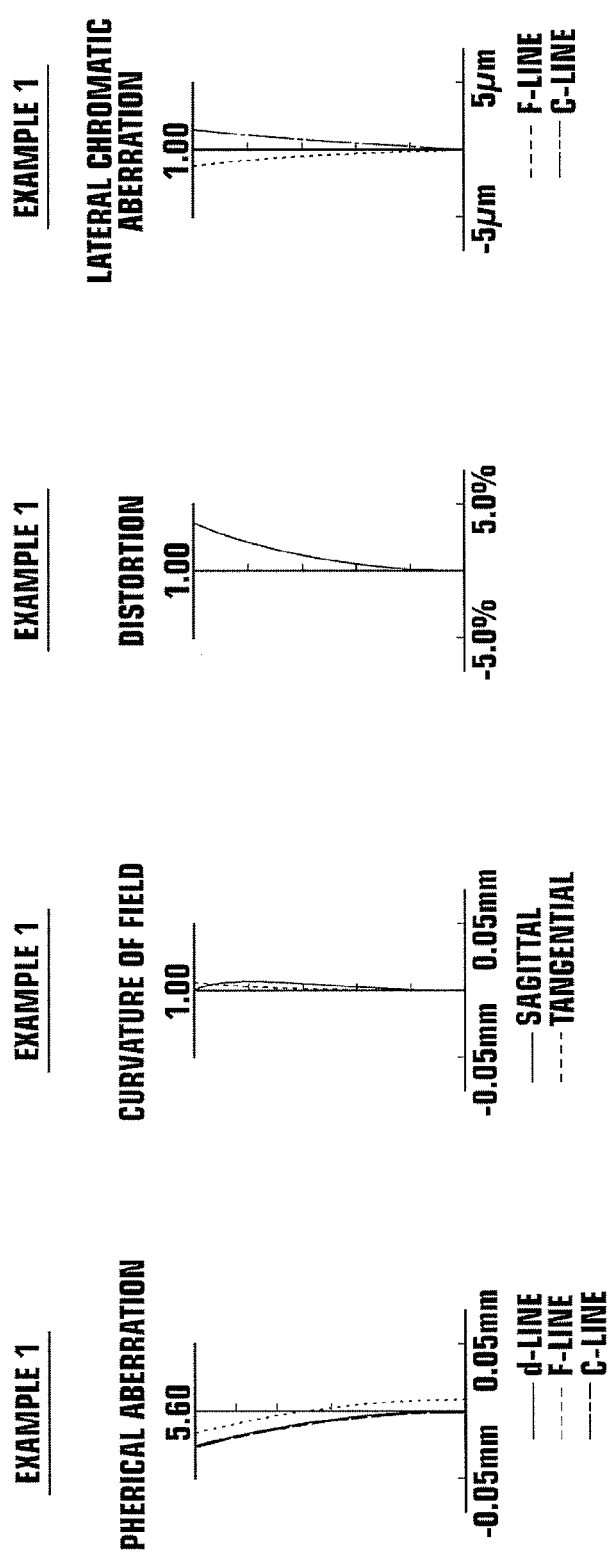

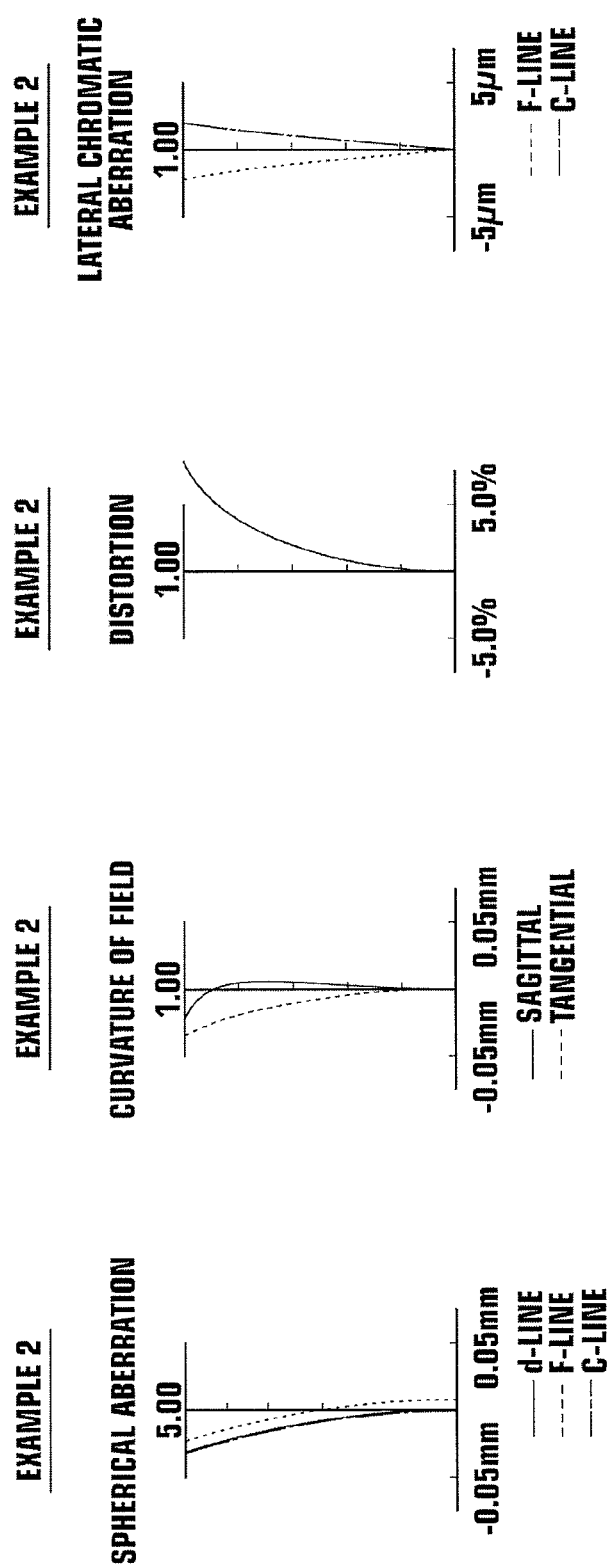

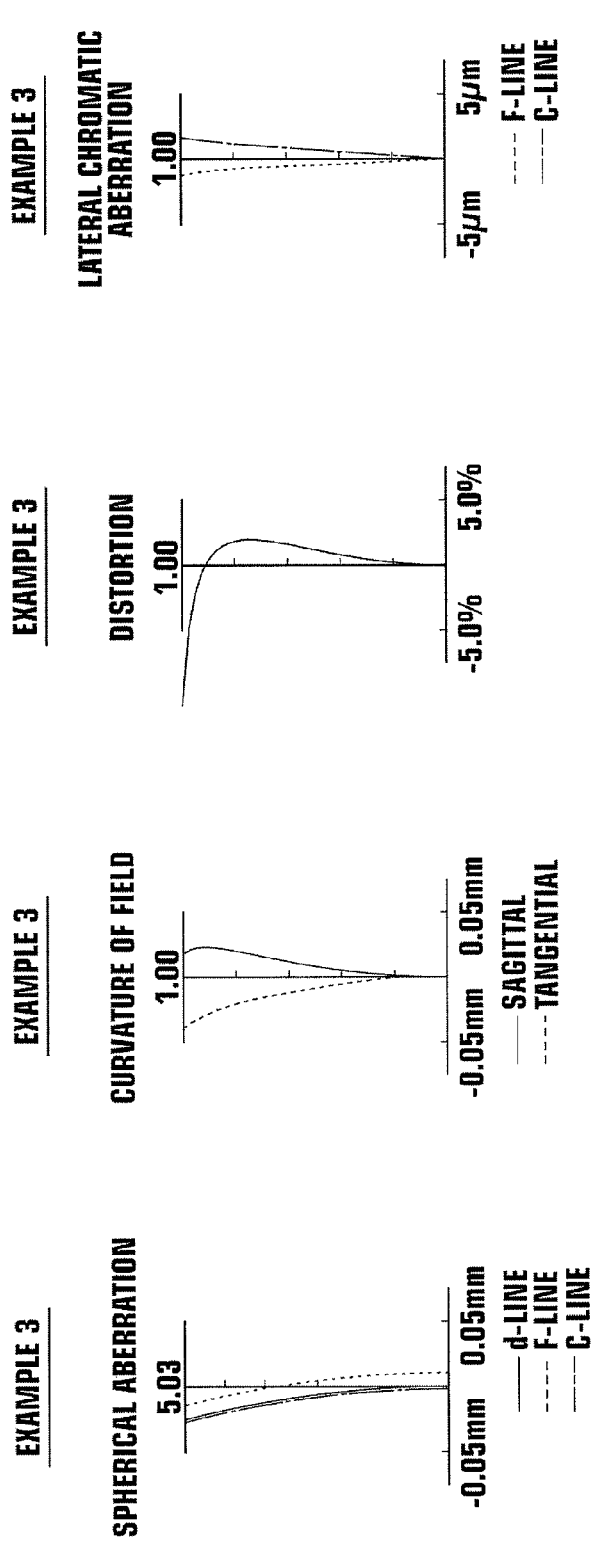

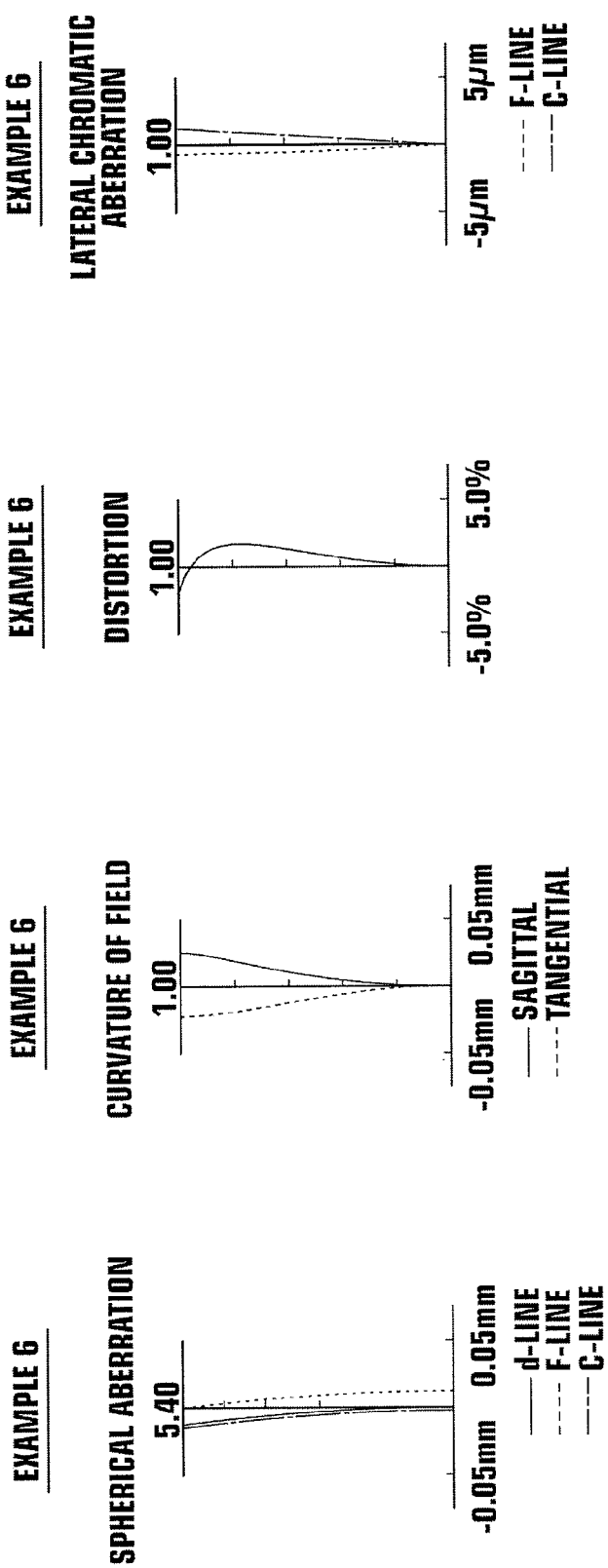

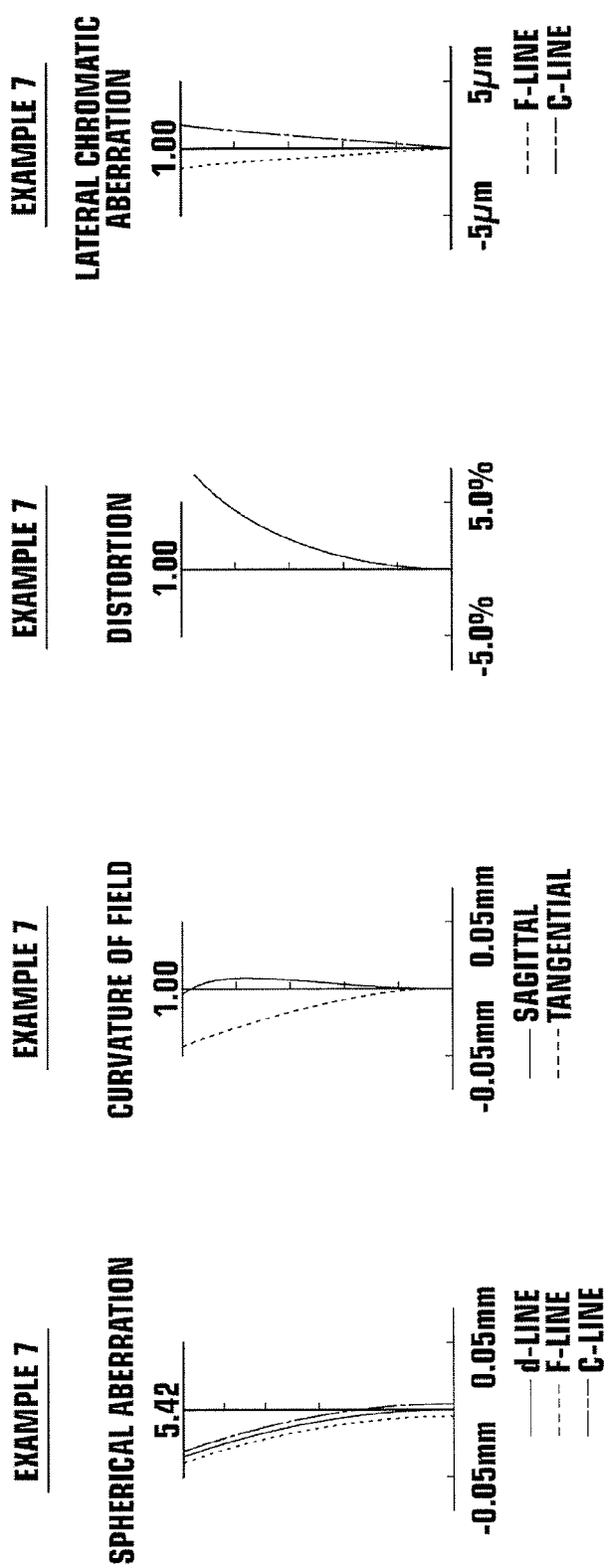

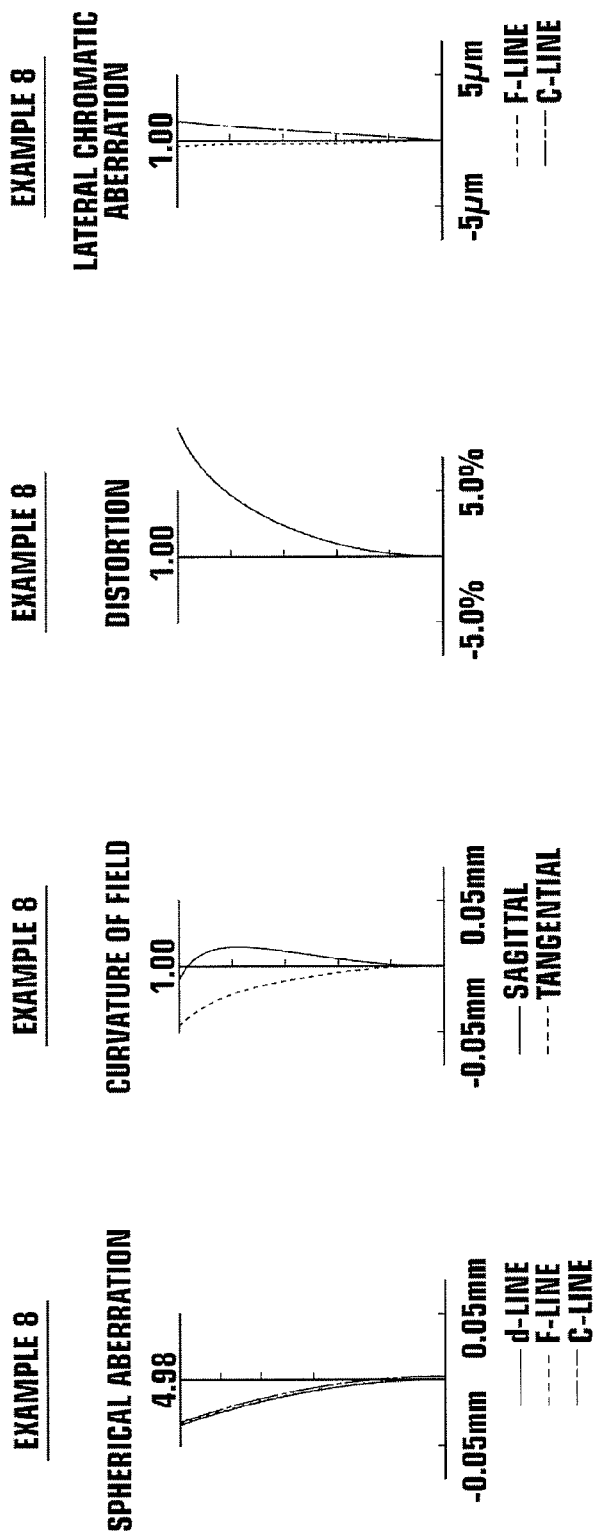

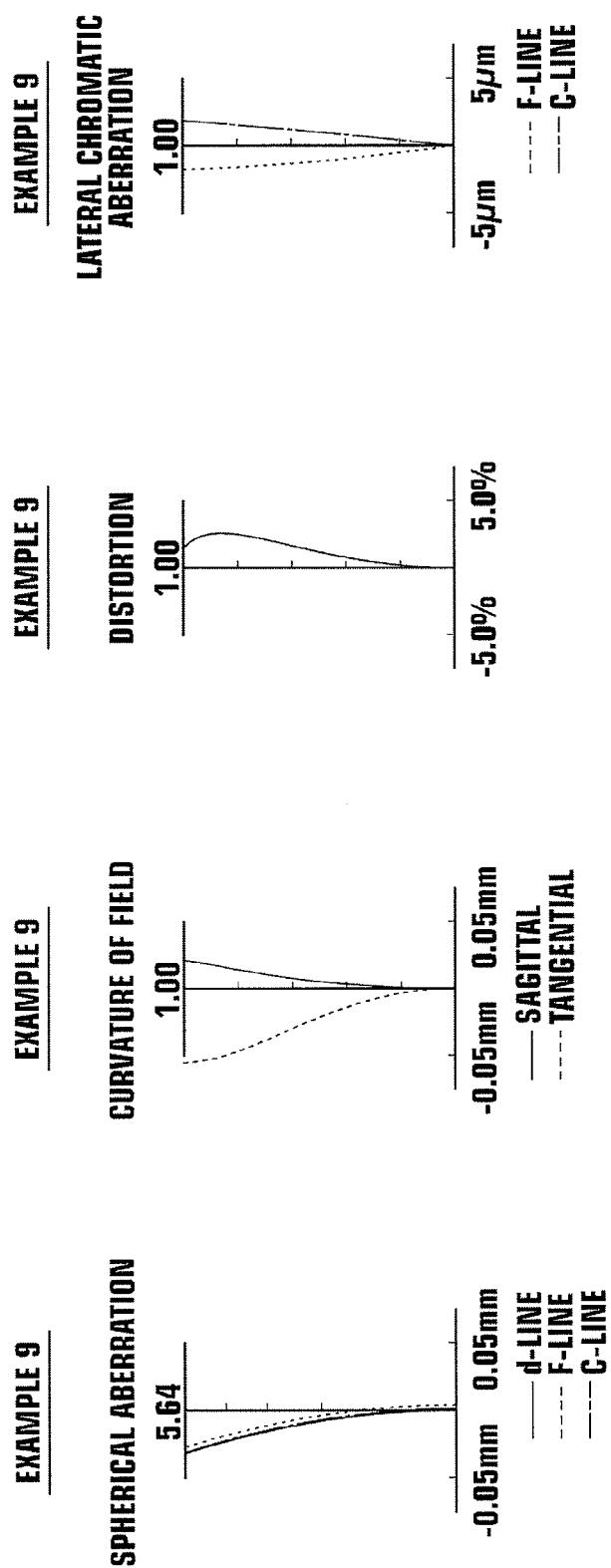

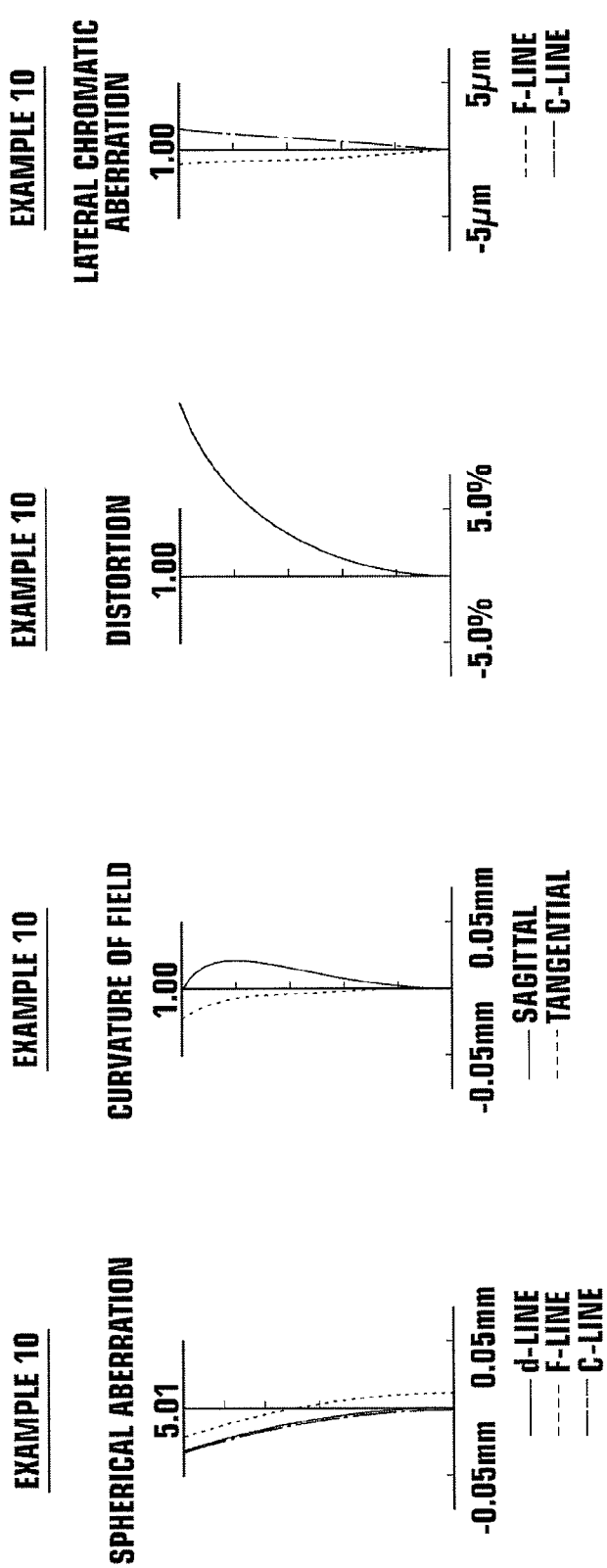

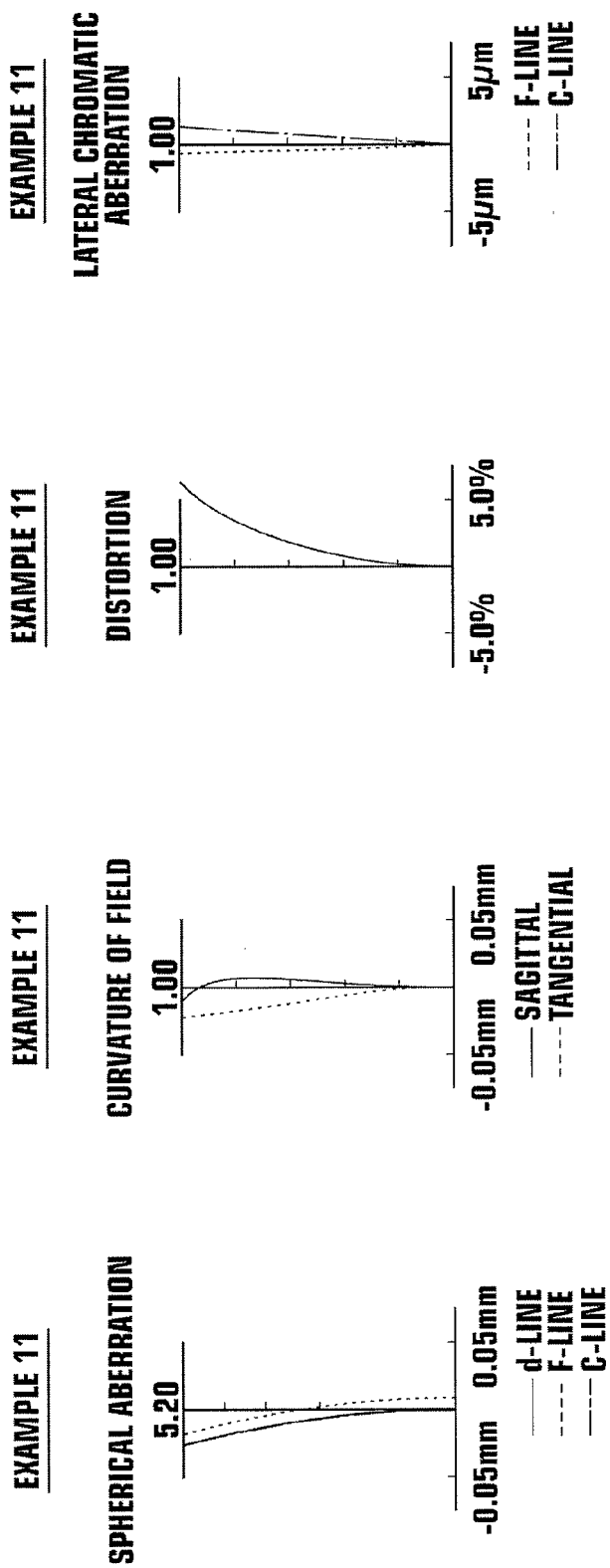

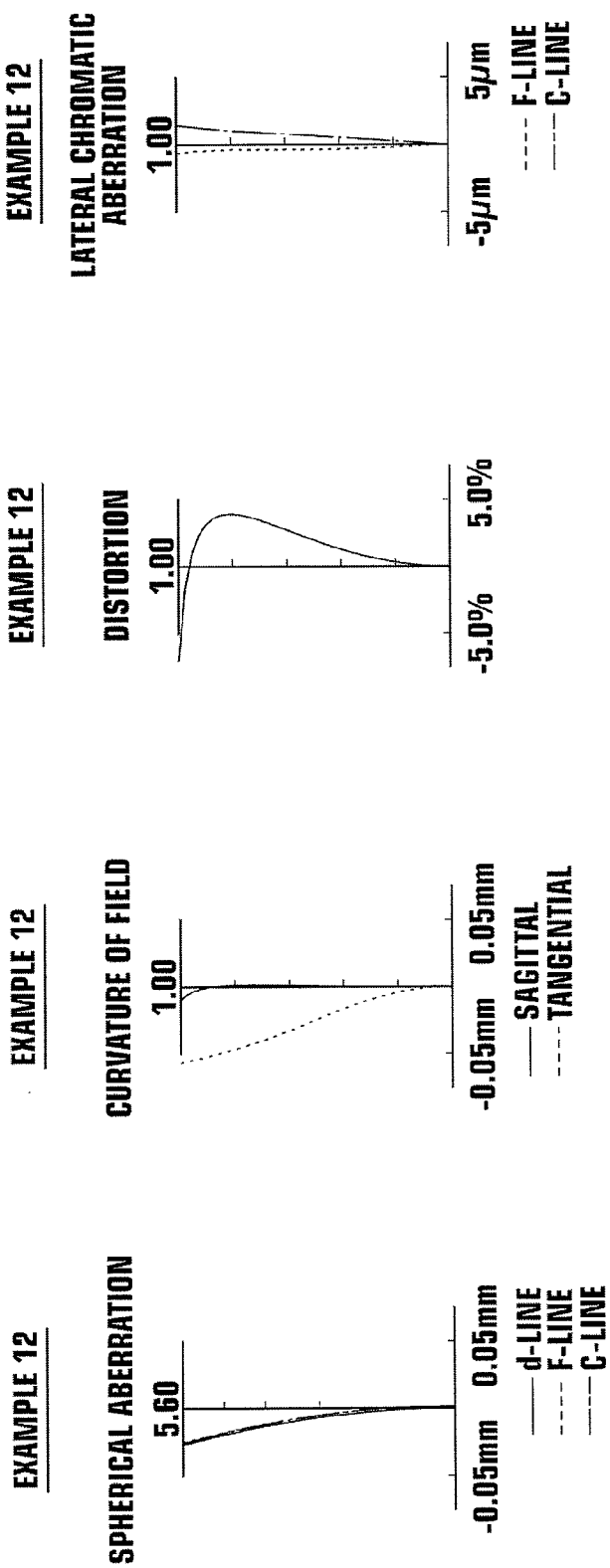

CONVENTIONAL EXAMPLE 1

CONVENTIONAL EXAMPLE 2

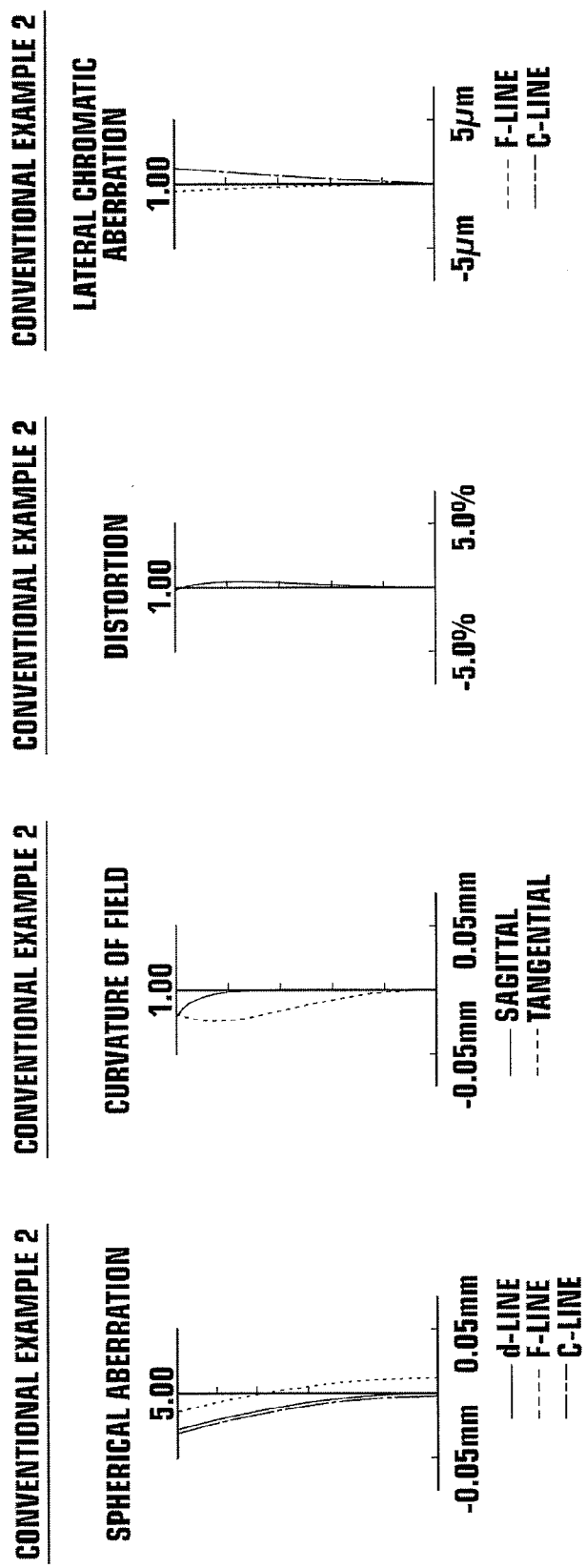

COMPARATIVE EXAMPLE

OBJECTIVE LENS FOR ENDOSCOPE AND ENDOSCOPE

BACKGROUND OF THE INVENTION

1. Field of the Invention

The present invention relates to objective lenses (objectives) for endoscopes, and endoscopes. Particularly, the present invention relates to objective lenses for endoscopes that have both long back focus and wide angles of view, and endoscopes including the objective lenses for endoscopes.

2. Description of the Related Art

Conventionally, endoscopes were used in medical fields to observe the insides of patients' bodies and to treat the patients. Objective lenses for observation are arranged at the inserting ends of the endoscopes. In recent years, electronic endoscopes in which images obtained by using the objective lenses are imaged by solid-state imaging devices are generally used. As objective lenses appropriate for the electronic endoscopes, objective lenses disclosed, for example, in U.S. Patent Application Publication No. 20080249367, Japanese Unexamined Patent Publication No. 2008-152210, and Japanese Unexamined Patent Publication No. 2007-249189, which were invented by the inventor of the present invention, are well known.

Ordinarily, a single objective lens is used in observation by using an endoscope. Therefore, the same objective lens is used to observe the field of view during insertion of the endoscope into the body of a patient and to observe a diseased region in the body of the patient after stopping insertion of the endoscope. Hence, the objective lens of the endoscope needs to satisfy both of a demand that the objective lens should have a wide angle of view to make it easy to insert the endoscope into the body of a patient during insertion and a demand that the objective lens should magnify a diseased region at as high a magnification ratio as possible so that the diseased region is easily and accurately observed. Therefore, conventionally, objective lenses (hereinafter referred to as conventional-type objective lenses, or conventional type) in which large negative distortion was generated were mainly used to satisfy such demands. In the conventional-type objective lenses, the large negative distortion was generated to observe a central area of an image at a high magnification ratio and to observe a peripheral area of the image at a lower magnification ratio but with a wide angle of view so that a wide area is observed. Here, the "large negative distortion" generated in the conventional-type objective lens is represented by using a notation method in which ideal image height is ftanθ (f: focal length of entire system, θ: half angle of view), which is used to express the distortion of an imaging lens having a general angle of view.

Images obtained by using the conventional-type objective lens will be described with reference to FIGS. 32 and 33. FIG. 32 is a schematic diagram illustrating relationships between angles of view and image heights in an optical system of an equidistant projection method. FIG. 33 is a schematic diagram illustrating relationships between the angles of view and image heights in a conventional-type objective lens for an endoscope in a manner similar to FIG. 32. The equidistant projection method is widely adopted in fisheye lenses, which are wide-angle lenses. In the equidistant projection method, half angles of view and image heights are proportional to each other.

To simplify explanation, FIGS. 32 and 33 illustrate cases in which the maximum half angle of view is 90 degrees and the full angle of view is 180 degrees. Semicircles composed of a plurality of sectors illustrated in upper parts of FIGS. 32 and 33 represent angles of view. The center angles of the sectors indicate angles of view. Specifically, center line M is 0 degree, and an angle with respect to the center line M is a half angle of view. Further, in FIGS. 32 and 33, angles of view of 18 degrees, 36 degrees, 54 degrees, 72 degrees and 90 degrees, which are 20%, 40%, 60%, 80% and 100% of the maximum half angle of view respectively, are illustrated.

A plurality of concentric circles illustrated in the lower part of FIG. 32 represent image heights. In FIG. 32, circles C2, C4, C6, C8 and C10 represent image heights corresponding to half angles of view of 18 degrees, 36 degrees, 54 degrees, 72 degrees and 90 degrees, respectively. Circle C10, which is the outermost circle, represents the maximum image height. FIG. 32 illustrates the equidistant projection method, in which half angles of view and image heights are proportional to each other. Therefore, the circles C2, C4, C6, C8 and C10 are concentric circles that are equidistant from each other. When point A at a half angle of view that is 80% of the maximum half angle of view is projected onto an image field (image surface), point A' is formed on the image field, and the image height of point A' is 80% of maximum image height h10.

A plurality of concentric circles illustrated in the lower part of FIG. 33 represent image heights. In FIG. 33, circles Cj2, Cj4, Cj6, Cj8 and Cj10 represent image heights corresponding to half angles of view of 18 degrees, 36 degrees, 54 degrees, 72 degrees and 90 degrees, respectively. Circle Cj10, which is the outermost circle, represents the maximum image height. FIG. 33 illustrates the conventional type. Therefore, the circles Cj2, Cj4, Cj6, Cj8 and Cj10, which are concentric, are not equidistant from each other. In FIG. 33, a distance between the circle Cj2 and the circle Cj4 in the central area is wider than a distance between the circle Cj8 and the circle Cj10 in the peripheral area. When point B at a half angle of view that is 80% of the maximum half angle of view is projected onto an image field, point B' is formed on the image field, and image height hj8 of point B' is not 80% of maximum image height hj10 but greater than 80% of the maximum image height hj10.

When FIGS. 32 and 33 are compared with each other, in the conventional-type objective lens illustrated in FIG. 33, the ratio of an image of a region with a small angle of view is greater than the ratio of an image of a region with a large angle of view. Therefore, in FIG. 33, the image in the peripheral area of the image field looks compressed and small, compared with the image of the equidistant projection method illustrated in FIG. 32. In other words, in the conventional-type objective lens, the amount of data about the region with the large angle of view is smaller, compared with the equidistant projection method.

However, as the angles of view of lenses have become wider, if an object in the peripheral area of an image is observed too small, a risk of overlooking a lesion in the peripheral area increases. Therefore, it is not desirable that too large negative distortion is generated practically. Further, in recent years, the resolution (number of pixels) of solid-state imaging devices became higher, and the qualities of images obtained by using the solid-state imaging devices were improved. Therefore, a demand for obtaining more precise and accurate data also about the peripheral area of the image, which used to be regarded as being relatively less important, became higher.

Further, objective lenses for endoscopes need to have sufficiently long back focus. When a solid-state imaging device is mounted on an endoscope, and the image field of the solid-state imaging device is arranged parallel to the long axis of the insertion portion of the endoscope, an optical path conversion prism for bending an optical path is provided between the objective lens and the solid-state imaging device.

Therefore, it is necessary that a distance between the end surface of the objective lens and the imaging position is sufficiently long to insert the optical path conversion prism therebetween (a distance substantially similar to the back focus).

SUMMARY OF THE INVENTION

In view of the foregoing circumstances, it is an object of the present invention to provide an objective lens for an endoscope with a wide angle of view that can produce an improved image of a peripheral area and that has sufficiently long back focus. Further, it is another object of the present invention to provide an endoscope including the objective lens for an endoscope.

An objective lens for an endoscope according to the present invention is an objective lens for an endoscope, wherein the full angle of view of the objective lens exceeds 120 degrees, and wherein a most-object-side surface is spherical, and wherein the following condition formulas (1) and (2) are satisfied:

$$0.7 < \theta8/\theta10 < 0.8 \quad (1); \text{ and}$$

$$5 < R_1/f < 15 \quad (2),$$

where $\theta10$: half angle of view corresponding to a maximum image height;

$\theta8$: half angle of view corresponding to an image height that is 80% of the maximum image height;

$R_1$: curvature radius (radius of curvature) of the most-object-side surface; and f: focal length of the entire system of the objective lens.

The condition formula (1) defines ratio $\theta8/\theta10$, which is the ratio of a half angle of view corresponding to an image height that is 80% of the maximum image height to a half angle of view corresponding to the maximum image height. In an optical system using an equidistant projection method, $\theta8/\theta10$ is 0.8. However, in most of conventional-type objective lenses, $\theta8/\theta10$ is approximately 0.65.

The present invention provides, by the condition formula (1), an optical system in which half angles of view and image heights are substantially proportional to each other.

An objective lens for an endoscope of the present invention may have 4-group/5-element structure comprising:

a negative first lens having a concave surface on the image side thereof;

a positive second lens;

a positive third lens having, on the object side thereof, a flat surface or a surface the absolute value of the curvature radius of which is greater than that of the other surface thereof; and a cemented lens (a group of a plurality of simple lenses joined together or attached to each other, such as a doublet) including a fourth lens and a fifth lens joined together, one of the fourth lens and the fifth lens being a positive lens and the other one of the fourth and fifth lenses being a negative lens, the cemented lens having positive refractive power as a whole group of the fourth and fifth lenses, wherein the negative first lens, the positive second lens, the positive third lens, the fourth lens, and the fifth lens are arranged in order from the object side of the objective lens, and wherein a stop is arranged between the second lens and the third lens, and wherein the following condition formulas (3) and (4) are satisfied:

$$Bf/f > 2.0; \quad (3)$$
and $$\frac{f^2 \times |v_4 - v_5|}{|R_{45}| \times (Bf + D_5/n_5)} \geq 10, \quad (4)$$

where Bf: back focus of the entire system of the objective lens;

$v_4$: Abbe number of the fourth lens for d-line;

$v_5$: Abbe number of the fifth lens for d-line;

$R_{45}$: curvature radius of a cemented surface between the fourth lens and the fifth lens;

$D_5$: thickness of the fifth lens at the center thereof; and $n_5$: refractive index of the fifth lens for d-line.

When the objective lens for an endoscope of the present invention adopts the aforementioned 4-group/5-element structure, it is desirable that the objective lens satisfies the following condition formula (5):

$$(v_2 + v_n) < 45 \quad (5),$$

where $v_2$: Abbe number of the second lens for d-line; and $v_n$: Abbe number of the negative lens included in the cemented lens for d-line.

Alternatively, an objective lens for an endoscope of the present invention may have 4-group/6-element structure comprising:

a negative first lens having a concave surface on the image side thereof;

a first cemented lens including a second lens and a third lens joined together, one of the second lens and the third lens being a positive lens and the other one of the second and third lenses being a negative lens;

a positive fourth lens having, on the object side thereof, a flat surface or a surface the absolute value of the curvature radius of which is greater than that of the other surface thereof; and a second cemented lens including a fifth lens and a sixth lens joined together, one of the fifth lens and the sixth lens being a positive lens and the other one of the fifth lens and the sixth lens being a negative lens, wherein the negative first lens, the second lens, the third lens, the positive fourth lens, the fifth lens and the sixth lens are arranged in order from the object side of the objective lens, and wherein a stop is arranged between the first cemented lens and the fourth lens, and wherein the following condition formulas (6) and (7) are satisfied:

$$Bf/f > 2.2; \quad (6)$$
and $$\frac{f^2 \times |v_5 - v_6|}{|R_{56}| \times (Bf + D_6/n_6)} \geq 6, \quad (7)$$

where Bf: back focus of the entire system of the objective lens;

$v_5$: Abbe number of the fifth lens for d-line;

$v_6$: Abbe number of the sixth lens for d-line;

$R_{56}$: curvature radius of a cemented surface between the fifth lens and the sixth lens;

$D_6$: thickness of the sixth lens at the center thereof; and $n_6$: refractive index of the sixth lens for d-line.

When the objective lens for an endoscope of the present invention adopts the aforementioned 4-group/6-element structure, it is desirable that the objective lens satisfies the following condition formula (8):

$$15.0 < |\nu_2 - \nu_3| \tag{8}$$

where $\nu_2$: Abbe number of the second lens for d-line; and
$\nu_2$: Abbe number of the third lens for d-line.

In the present invention, the term "most-object-side surface" refers to a most object side surface (a surface that is closest to the object) among surfaces constituting the objective lens for an endoscope. For example, when the objective lens for an endoscope is mounted onto an endoscope, if a protective member, such as a parallel flat plate, which has no refractive power is arranged on the most object side, the surface of the protective member is not regarded as the "most-object-side surface" in the present invention.

Further, in the present invention, the sign (plus or minus) of the curvature radius is positive when a surface projects to the object side, and negative when a surface projects to the image side.

Further, in the above condition formulas, a back focus in air (air converted length) should be used.

In the cemented lens included in the 4-group/5-element structure, the expression "one of the fourth lens and the fifth lens being a positive lens and the other one of the fourth and fifth lenses being a negative lens" encompasses both of a case in which the fourth lens is a positive lens and the fifth lens is a negative lens and a case in which the fourth lens is a negative lens and the fifth lens is a positive lens. Further, the expression means that the fourth lens is arranged on the object side of the fifth lens, in other words, the fourth lens is closer to the object. Further, in the first cemented lens and the second cemented lens included in the 4-group/6-element structure, the expression "one of the second lens and the third lens being a positive lens and the other one of the second and third lenses being a negative lens" and the expression "one of the fifth lens and the sixth lens being a positive lens and the other one of the fifth and sixth lenses being a negative lens" may be construed in a similar manner.

Further, values in each of the condition formulas are values at a reference wavelength (standard wavelength) for an objective lens for an endoscope, unless otherwise specified.

An endoscope of the present invention includes an objective lens for an endoscope of the present invention.

The present invention provides an objective lens for an endoscope that has a wide-angle of view, in which the full angle of view exceeds 120 degrees, and that can produce an improved image of a peripheral area, compared with conventional type. Further, the objective lens for an endoscope of the present invention has sufficiently long back focus. Further, the present invention provides an endoscope including the objective lens for an endoscope.

BRIEF DESCRIPTION OF THE DRAWINGS

FIG. 1 is a cross-sectional diagram illustrating the structure of an objective lens for an endoscope according to Example 1 of the present invention;

FIG. 2 is a cross-sectional diagram illustrating the structure of an objective lens for an endoscope according to Example 2 of the present invention;

FIG. 3 is a cross-sectional diagram illustrating the structure of an objective lens for an endoscope according to Example 3 of the present invention;

FIG. 4 is a cross-sectional diagram illustrating the structure of an objective lens for an endoscope according to Example 4 of the present invention;

FIG. 5 is a cross-sectional diagram illustrating the structure of an objective lens for an endoscope according to Example 5 of the present invention;

FIG. 6 is a cross-sectional diagram illustrating the structure of an objective lens for an endoscope according to Example 6 of the present invention;

FIG. 7 is a cross-sectional diagram illustrating the structure of an objective lens for an endoscope according to Example 7 of the present invention;

FIG. 8 is a cross-sectional diagram illustrating the structure of an objective lens for an endoscope according to Example 8 of the present invention;

FIG. 9 is a cross-sectional diagram illustrating the structure of an objective lens for an endoscope according to Example 9 of the present invention;

FIG. 10 is a cross-sectional diagram illustrating the structure of an objective lens for an endoscope according to Example 10 of the present invention;

FIG. 11 is a cross-sectional diagram illustrating the structure of an objective lens for an endoscope according to Example 11 of the present invention;

FIG. 12 is a cross-sectional diagram illustrating the structure of an objective lens for an endoscope according to Example 12 of the present invention;

FIG. 13A is a diagram illustrating the spherical aberration of the objective lens for an endoscope according to Example 1 of the present invention;

FIG. 13B is a diagram illustrating the curvature of field of the objective lens for an endoscope according to Example 1 of the present invention;

FIG. 13C is a diagram illustrating the distortion of the objective lens for an endoscope according to Example 1 of the present invention;

FIG. 13D is a diagram illustrating the lateral chromatic aberration of the objective lens for an endoscope according to Example 1 of the present invention;

FIG. 14A is a diagram illustrating the spherical aberration of the objective lens for an endoscope according to Example 2 of the present invention;

FIG. 14B is a diagram illustrating the curvature of field of the objective lens for an endoscope according to Example 2 of the present invention;

FIG. 14C is a diagram illustrating the distortion of the objective lens for an endoscope according to Example 2 of the present invention;

FIG. 14D is a diagram illustrating the lateral chromatic aberration of the objective lens for an endoscope according to Example 2 of the present invention;

FIG. 15A is a diagram illustrating the spherical aberration of the objective lens for an endoscope according to Example 3 of the present invention;

FIG. 15B is a diagram illustrating the curvature of field of the objective lens for an endoscope according to Example 3 of the present invention;

FIG. 15C is a diagram illustrating the distortion of the objective lens for an endoscope according to Example 3 of the present invention;

FIG. 15D is a diagram illustrating the lateral chromatic aberration of the objective lens for an endoscope according to Example 3 of the present invention;

FIG. 18A is a diagram illustrating the spherical aberration of the objective lens for an endoscope according to Example 6 of the present invention;

FIG. 18B is a diagram illustrating the curvature of field of the objective lens for an endoscope according to Example 6 of the present invention;

FIG. 18C is a diagram illustrating the distortion of the objective lens for an endoscope according to Example 6 of the present invention;

FIG. 18D is a diagram illustrating the lateral chromatic aberration of the objective lens for an endoscope according to Example 6 of the present invention;

FIG. 19A is a diagram illustrating the spherical aberration of the objective lens for an endoscope according to Example 7 of the present invention;

FIG. 19B is a diagram illustrating the curvature of field of the objective lens for an endoscope according to Example 7 of the present invention;

FIG. 19C is a diagram illustrating the distortion of the objective lens for an endoscope according to Example 7 of the present invention;

FIG. 19D is a diagram illustrating the lateral chromatic aberration of the objective lens for an endoscope according to Example 7 of the present invention;

FIG. 20A is a diagram illustrating the spherical aberration of the objective lens for an endoscope according to Example 8 of the present invention;

FIG. 20B is a diagram illustrating the curvature of field of the objective lens for an endoscope according to Example 8 of the present invention;

FIG. 20C is a diagram illustrating the distortion of the objective lens for an endoscope according to Example 8 of the present invention;

FIG. 20D is a diagram illustrating the lateral chromatic aberration of the objective lens for an endoscope according to Example 8 of the present invention;

FIG. 21A is a diagram illustrating the spherical aberration of the objective lens for an endoscope according to Example 9 of the present invention;

FIG. 21B is a diagram illustrating the curvature of field of the objective lens for an endoscope according to Example 9 of the present invention;

FIG. 21C is a diagram illustrating the distortion of the objective lens for an endoscope according to Example 9 of the present invention;

FIG. 21D is a diagram illustrating the lateral chromatic aberration of the objective lens for an endoscope according to Example 9 of the present invention;

FIG. 22A is a diagram illustrating the spherical aberration of the objective lens for an endoscope according to Example 10 of the present invention;

FIG. 22B is a diagram illustrating the curvature of field of the objective lens for an endoscope according to Example 10 of the present invention;

FIG. 22C is a diagram illustrating the distortion of the objective lens for an endoscope according to Example 10 of the present invention;

FIG. 22D is a diagram illustrating the lateral chromatic aberration of the objective lens for an endoscope according to Example 10 of the present invention;

FIG. 23A is a diagram illustrating the spherical aberration of the objective lens for an endoscope according to Example 11 of the present invention;

FIG. 23B is a diagram illustrating the curvature of field of the objective lens for an endoscope according to Example 11 of the present invention;

FIG. 23C is a diagram illustrating the distortion of the objective lens for an endoscope according to Example 11 of the present invention;

FIG. 23D is a diagram illustrating the lateral chromatic aberration of the objective lens for an endoscope according to Example 11 of the present invention;

FIG. 24A is a diagram illustrating the spherical aberration of the objective lens for an endoscope according to Example 12 of the present invention;

FIG. 24B is a diagram illustrating the curvature of field of the objective lens for an endoscope according to Example 12 of the present invention;

FIG. 24C is a diagram illustrating the distortion of the objective lens for an endoscope according to Example 12 of the present invention;

FIG. 24D is a diagram illustrating the lateral chromatic aberration of the objective lens for an endoscope according to Example 12 of the present invention;

FIG. 28A is a diagram illustrating the spherical aberration of the objective lens for an endoscope according to Conventional Example 2;

FIG. 28B is a diagram illustrating the curvature of field of the objective lens for an endoscope according to Conventional Example 2;

FIG. 28C is a diagram illustrating a distortion of the objective lens for an endoscope according to Conventional Example 2;

FIG. 28D is a diagram illustrating a lateral chromatic aberration of the objective lens for an endoscope according to Conventional Example 2;

DESCRIPTION OF THE PREFERRED EMBODIMENTS

Figures 16A, 16B, 16C, 16D:
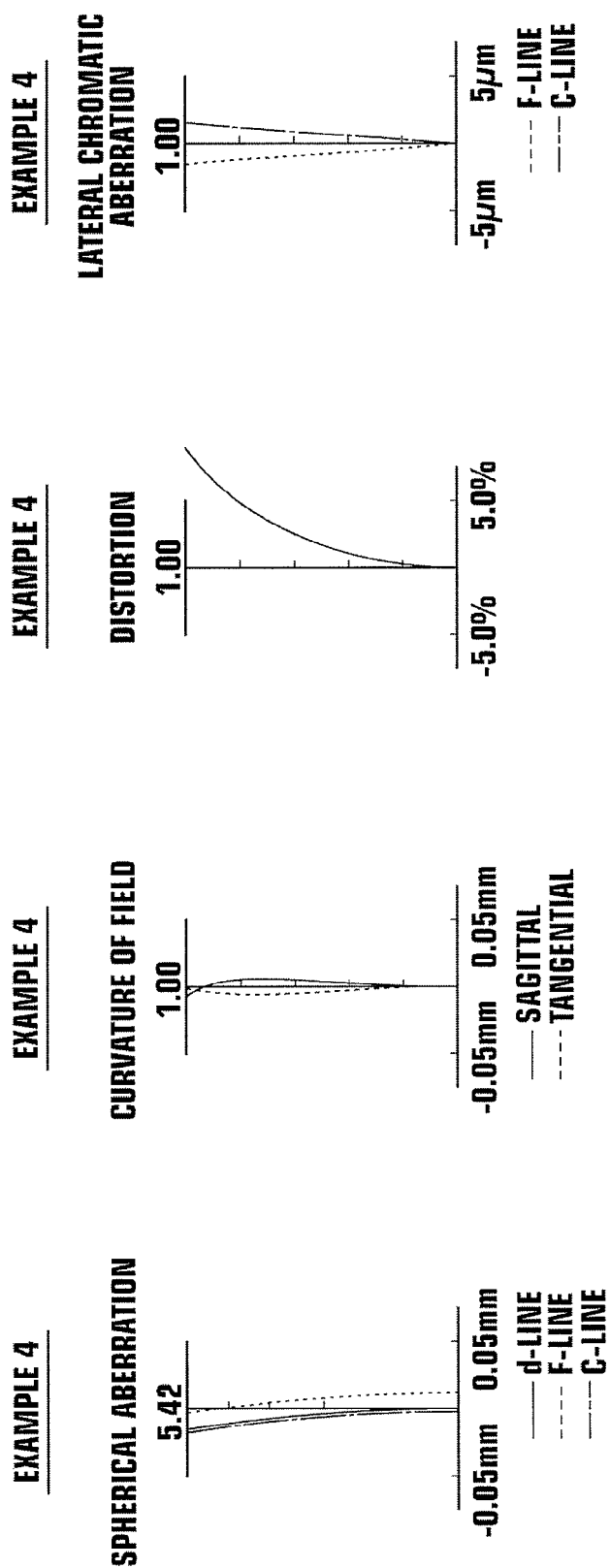
FIG. 16A is a diagram illustrating the spherical aberration of the objective lens for an endoscope according to Example 4 of the present invention.
FIG. 16B is a diagram illustrating the curvature of field of the objective lens for an endoscope according to Example 4 of the present invention.
FIG. 16C is a diagram illustrating the distortion of the objective lens for an endoscope according to Example 4 of the present invention.
FIG. 16D is a diagram illustrating the lateral chromatic aberration of the objective lens for an endoscope according to Example 4 of the present invention.
Figures 17A, 17B, 17C, 17D:
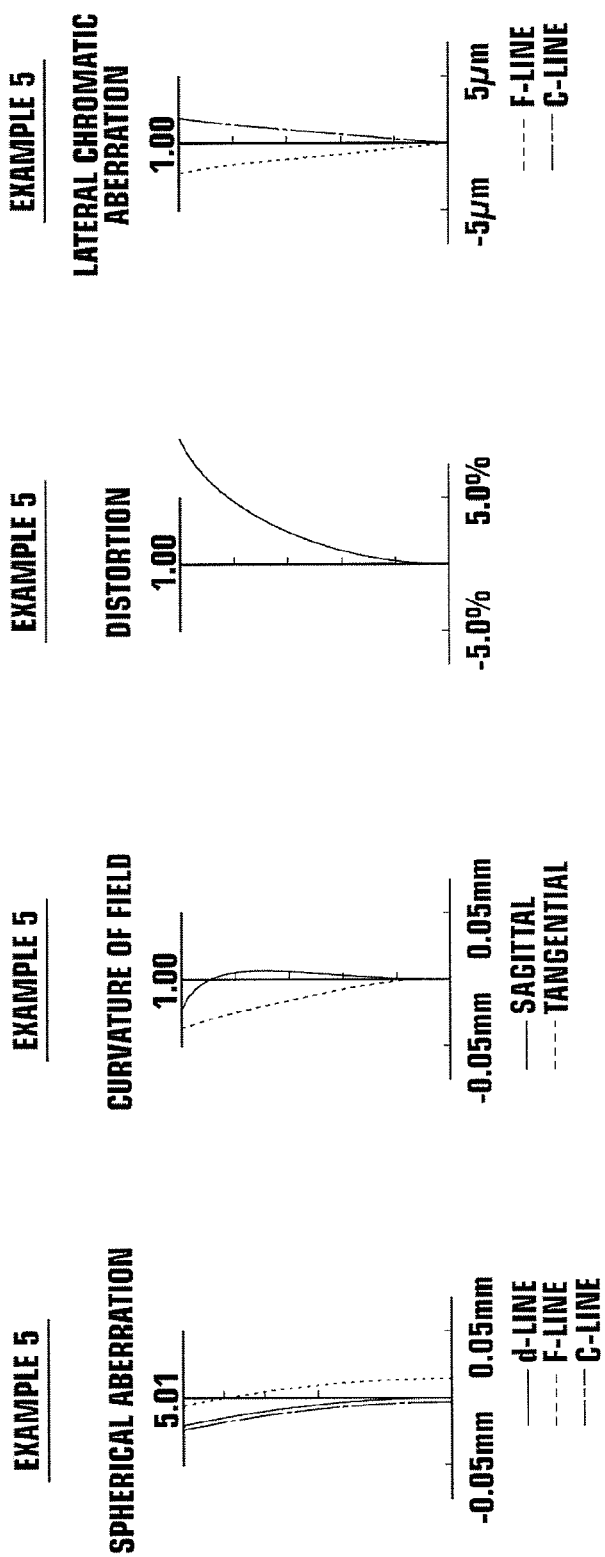
FIG. 17A is a diagram illustrating the spherical aberration of the objective lens for an endoscope according to Example 5 of the present invention.
FIG. 17B is a diagram illustrating the curvature of field of the objective lens for an endoscope according to Example 5 of the present invention.
FIG. 17C is a diagram illustrating the distortion of the objective lens for an endoscope according to Example 5 of the present invention.
FIG. 17D is a diagram illustrating the lateral chromatic aberration of the objective lens for an endoscope according to Example 5 of the present invention.

Hereinafter, embodiments of the present invention will be described in detail with reference to drawings. FIGS. 1 through 12 are cross-sectional diagrams, each illustrating the structure of an objective lens (objective) for an endoscope according to an embodiment of the present invention. FIGS. 1 through 12 correspond to Examples 1 through 12, which will be described later, respectively. The basic structure of each of the examples illustrated in FIGS. 1 through 12 is similar to each other, and the method of illustration of FIGS. 1 through 12 is similar to each other. Therefore, first, the basic structure of an objective lens for an endoscope according to an embodiment of the present invention will be described with reference to FIG. 1.

The objective lens for an endoscope according to the present invention is a wide angle lens, the full angle of view of which exceeds 120 degrees, and structured in such a manner that a most-object-side surface, which is closest to the object among surfaces constituting the objective lens, is spherical. The objective lens for an endoscope illustrated in FIG. 1 includes five lenses of first lens L11 through fifth lens L15. An object-side surface of the first lens L11, which is the most-object-side lens (a lens closest to the object among the lenses), is spherical. In FIG. 1, the left side of FIG. 1 is the object side, and the right side of FIG. 1 is the image side.

Further, in FIG. 1, an axial beam 2 and an off-axial beam 3 that corresponds to a maximum image height are illustrated together with the objective lens for an endoscope. Angle ω between the principal ray included in the off-axial beam 3 and optical axis Z is the maximum half angle of view. When the optical system is rotationally symmetrical with respect to the optical axis, as illustrated in FIG. 1, the full angle of view is twice the maximum half angle of vies. Specifically, the endoscope of the present embodiment is structured in such a manner that 2ω exceeds 120 degrees.

In the example illustrated in FIG. 1, optical member PP in parallel flat plate form is arranged on the image side of the most-image-side lens, and imaging position P is located on the image-side surface of the optical member PP. The optical member PP corresponds to an optical path conversion prism. FIG. 1 illustrates the optical member PP, assuming that the optical path conversion prism is developed in the same direction as the optical axis Z so that the imaging position P is located in the same direction as the optical axis Z.

Further, the objective lens for an endoscope according to the present embodiment is structured to satisfy the following condition formulas (1) and (2):

$$0.7 < \theta 8/\theta 10 < 0.8 \qquad (1); \text{ and}$$

$$5 < R_1/f < 15 \qquad (2),$$

where θ10 represents a half angle of view corresponding to a maximum image height, θ8 represents a half angle of view corresponding to an image height that is 80% of the maximum image height, $R_1$ represents the curvature radius of the most-object-side surface, and f represents the focal length of the entire system of the objective lens.

The condition formula (1) represents a relationship between image heights and angles of view. As stated above, the value of θ8/θ10 is 0.8 in an equidistant projection method, in which the half angles of view and the image heights are proportional to each other. However, the value of θ8/θ10 is approximately 0.65 in an conventional-type optical system, in which a large negative distortion is generated to observe a central area of an image in a large size.

Therefore, the objective lens for an endoscope according to the present embodiment is structured to satisfy the condition formula (1), thereby making the value of θ8/θ10 closer to the value of θ8/θ10 in the optical system of the equidistant projection method than the value of θ8/θ10 of the conventional type. Further, in the objective lens for an endoscope according to the present embodiment, half angles of view and image heights are substantially proportional to each other. Accordingly, the objective lens for an endoscope according to the present embodiment can have a wide angle of view and increase the data amount about the peripheral area of an image, compared with the conventional type. Consequently, the image in the peripheral area can be improved.

The value of θ8/θ10 may be increased to exceed 0.7 and to a value closer to 0.8, which is the same as the value of θ8/θ10 of the equidistant projection method, by making the most-object-side surface of the lens system convex and by reducing the curvature radius $R_1$ of the most-object-side surface. The curvature radius $R_1$ can be reduced by satisfying the upper limit of condition formula (2). Accordingly, the condition "0.7<θ8/θ10" can be satisfied. However, when the curvature radius $R_1$ is reduced to a value lower than the lower limit of the condition formula (2), it becomes difficult to obtain a lens system that has a wide angle of view and long back focus.

Generally, the most-object-side surface of the objective lens for an endoscope is flat or in convex form in many cases so that a waste (unwanted particles, dust or the like) is not accumulated on the surface of the objective lens. In the present embodiment, the most-object-side surface is not flat but in convex form because of the reason explained above with respect to θ8/θ10. Further, when the most-object-side surface is spherical, it is possible to improve the producibility of the lens, compared with the producibility of an aspherical lens.

Specifically, according to the first embodiment of the objective lens for an endoscope of the present invention, a lens system of 4-group/5-element structure, as illustrated for example in FIGS. 1 through 6, may be adopted. The 4-group/5-element structure includes negative first lens L11 having a concave surface on the image side thereof, positive second lens L12, positive third lens L13 having, on the object side thereof, a flat surface or a surface the absolute value of the curvature radius of which is greater than that of the other surface thereof, and a cemented lens including fourth lens L4 and fifth lens L5 joined together. One of the fourth lens L14 and the fifth lens L15 is a positive lens and the other one of the fourth and fifth lenses L14 and L15 is a negative lens. Further, the cemented lens has positive refractive power as a whole group of the fourth and fifth lenses, and the negative first lens LU, the positive second lens L12, the positive third lens L13, the fourth lens L14 and the fifth lens L15 are arranged in order from the object side of the objective lens. In the structure of the first embodiment, it is desirable that aperture stop St (a stop, an aperture, a diaphragm or the like) is arranged between the second lens L12 and the third lens L13. In FIGS. 1 through 6, the aperture stop St does not represent the form nor the size of the aperture stop but the position of the aperture stop on the optical axis Z.

Further, it is desirable that the structure according to the first embodiment satisfies the following condition formula (3):

$$Bf/f > 2.0 \qquad (3),$$

where Bf represents the back focus (air converted length) of the entire system of the objective lens, and f represents the focal length of the entire system of the objective lens.

When the objective lens satisfies the condition formula (3), it is possible to obtain long back focus relative to the focal length. Therefore, it is possible to arrange an optical path conversion prism between the objective lens for an endoscope and an image field.

Further, it is desirable that the structure according to the first embodiment satisfies the following condition formula (4):

$$\frac{f^2 \times |v_4 - v_5|}{|R_{45}| \times (Bf + D_5/n_5)} \geq 10, \qquad (4)$$

where Bf represents the back focus of the entire system of the objective lens, $v_4$ represents the Abbe number of the fourth lens for d-line, $v_5$ represents the Abbe number of the fifth lens for d-line, $R_{45}$ represents the curvature radius of a cemented surface between the fourth lens and the fifth lens, $D_5$ represents the thickness of the fifth lens at the center thereof, and $n_5$ represents the refractive index of the fifth lens for d-line.

The condition formula (4) represents the degree of appropriateness of correction of lateral chromatic aberration (chromatic aberration of magnification), focusing on a difference between the Abbe number of the fourth lens L14 and that of the fifth lens L15 and a cemented surface between the fourth lens L14 and the fifth lens L15 in the cemented lens including the fourth lens L14 and the fifth lens L15. The cemented lens constitutes a part of a rear-group convergence system on the image side of the aperture stop St. Further, the condition formula (4) may be transformed to the following formula (4'):

$$\frac{|v_4 - v_5|}{\frac{|R_{45}|}{f} \times \frac{(Bf + D_5/n_5)}{f}} \geq 10. \qquad (4')$$

As the formula (4') shows, the left side of the condition formula (4) may be regarded as including three separate terms of the first term, the second term and the third term. The first term represents a difference between the Abbe number of the fourth lens L14 and the Abbe number of the fifth lens L15. The second term normalizes the absolute value of the curvature radius of the cemented surface by the focal length. The third term normalizes the sum of the back focus of the entire system and an air converted length on the optical axis of the fifth lens L15, in other words, a length from the cemented surface to the imaging position by the focal length.

The first through third terms represent three advantageous conditions for correcting the lateral chromatic aberration. The lateral chromatic aberration is corrected more appropriately as the difference between the Abbe numbers of the two lenses constituting the cemented lens, which are a positive lens and a negative lens, is larger (the first term), and as the absolute value of the curvature radius of the cemented surface is smaller (the second term), and as a distance from the cemented surface to the imaging position is shorter (the third term). When the value is lower than the lower limit indicated in the condition formula (4), it becomes difficult to excellently correct the lateral chromatic aberration while a back focus that is greater than twice the focal length is maintained.

Further, in the objective lens according to the first embodiment, higher dispersion of the negative lens constituting the cemented lens is advantageous to correct the lateral chromatic aberration. Therefore, it is desirable that the Abbe number of the negative lens constituting the cemented lens is less than or equal to 20.

Further, it is desirable that the objective lens according to the first embodiment satisfies the following condition formula (5):

$$(v_2 + v_n) < 45 \qquad (5)$$

where $v_2$ represents the Abbe number of the second lens L12 for d-line, and $v_n$ represents the Abbe number of the negative lens included in the cemented lens for d-line.

The condition formula (5) is used to efficiently correct the lateral chromatic aberration by setting the Abbe number of the positive second lens L12 on the object side of the aperture stop St and the Abbe number of a material used for the negative lens included in the cemented lens on the image side of the aperture stop St at a low value.

Ordinarily, when the chromatic aberration is insufficiently corrected in an imaging lens, a focal length for a short wavelength is shorter than a focal length for a long wavelength. Therefore, both of a longitudinal chromatic aberration and a lateral chromatic aberration on the short wavelength side are minus (so-called "under"), compared with those of a reference wavelength. When the "under" lateral chromatic aberration is corrected, the Abbe number of the positive lens on the image side of the aperture stop St should be increased, and the Abbe number of the negative lens on the image side of the aperture stop St should be reduced. In contrast, on the object side of the aperture stop St, the Abbe number of the positive lens should be reduced, and the Abbe number of the negative lens should be increased. When the condition formula (5) is satisfied, it is possible to maintain the sum of the Abbe number of the positive second lens L12 on the object side of the aperture stop St and the Abbe number of the negative lens constituting the cemented lens on the image side of the aperture stop St at a low value. Therefore, the lateral chromatic aberration is easily corrected.

Next, an objective lens for an endoscope according to a second embodiment of the present invention will be described. As illustrated in FIGS. 7 through 12, a lens system of 4-group/6-element structure may be adopted in the second embodiment. The 4-group/6-element structure includes negative first lens L21 having a concave surface on the image side thereof, first cemented lens including second lens L22 and third lens L23 joined together, one of the second lens L22 and the third lens L23 being a positive lens and the other one of the second lens L22 and the third lens L23 being a negative lens, positive fourth lens L24 having, on the object side thereof, a flat surface or a surface the absolute value of the curvature radius of which is greater than that of the other surface thereof, and second cemented lens including fifth lens L25 and sixth lens L26 joined together, one of the fifth lens L25 and the sixth lens L26 being a positive lens and the other one of the fifth lens L25 and the sixth lens L25 being a negative lens. The negative first lens L21, the second lens L22, the third lens L23, the positive fourth lens L24, the fifth lens L25 and the sixth lens L26 are arranged in order from the object side of the objective lens. In the structure of the second embodiment, it is desirable that aperture stop St is arranged between the first cemented lens and the fourth lens L24. In FIGS. 7 through 12, the aperture stop St does not represent the form nor the size of the aperture stop but the position of the aperture stop on the optical axis Z.

Further, it is desirable that the structure according to the second embodiment satisfies the following condition formula (6):

$$Bf/f > 2.2 \quad (6),$$

where Bf represents the back focus (air converted length) of the entire system of the objective lens, and f represents the focal length of the entire system of the objective lens.

When the objective lens satisfies the condition formula (6), it is possible to obtain long back focus relative to the focal length. Therefore, it is possible to arrange an optical path conversion prism between the objective lens for an endoscope and an image field (imaging surface).

Further, it is desirable that the structure of the second embodiment satisfies the following condition formula (7):

$$\frac{f^2 \times |v_5 - v_6|}{|R_{56}| \times (Bf + D_6/n_6)} \geq 6, \quad (7)$$

where Bf represents the back focus (air converted length) of the entire system of the objective lens, $v_5$ represents the Abbe number of the fifth lens for d-line, $v_6$ represents the Abbe number of the sixth lens for d-line, $R_{56}$ represents the curvature radius of a cemented surface between the fifth lens and the sixth lens, $D_6$ represents the thickness of the sixth lens at the center thereof, and $n_6$ represents the refractive index of the sixth lens for d-line.

The condition formula (7) represents the degree of appropriateness of correction of lateral chromatic aberration, focusing on a difference between the Abbe number of the fifth lens L25 and that of the sixth lens L26 and a cemented surface between the fifth lens L25 and the sixth lens L26 in the second cemented lens including the fifth lens L25 and the sixth lens L26. The second cemented lens constitutes apart of a rear-group convergence system on the image side of the aperture stop St.

The left side of the condition formula (7) may be regarded as including three separate terms in a manner similar to the condition formula (4), described using the formula (4'). Specifically, the left side of the condition formula (7) may be regarded as including the fourth term, the fifth term and the sixth term. The fourth term represents a difference between the Abbe number of the fifth lens L25 and the Abbe number of the sixth lens L26. The fifth term normalizes the absolute value of the curvature radius of the cemented surface of the second cemented lens by the focal length. The sixth term normalizes the sum of the back focus of the entire system and an air converted length on the optical axis of the sixth lens L26, in other words, a length from the cemented surface of the second cemented lens to the imaging position by the focal length.

The fourth through sixth terms represent three advantageous conditions for correcting the lateral chromatic aberration. The lateral chromatic aberration is corrected more appropriately as the difference between the Abbe numbers of the two lenses constituting the second cemented lens, which are a positive lens and a negative lens, is larger (the fourth term), and as the absolute value of the curvature radius of the cemented surface of the second cemented lens is smaller (the fifth term), and as a distance from the cemented surface of the second cemented lens to the imaging position is shorter (the sixth term). When the value is lower than the lower limit indicated in the condition formula (7), it becomes difficult to excellently correct the lateral chromatic aberration while a back focus that is greater than 2.2 times longer than the focal length is maintained.

Further, in the objective lens according to the second embodiment, higher dispersion of the negative lens constituting the second cemented lens is advantageous to correct the lateral chromatic aberration. Therefore, it is desirable that the Abbe number of the negative lens constituting the second cemented lens is less than or equal to 20.

Further, it is desirable that the objective lens according to the second embodiment satisfies the following condition formula (8):

$$15.0 < |v_2 - v_3| \quad (8),$$

where $v_2$ represents the Abbe number of the second lens L22 for d-line, and $v_2$ represents the Abbe number of the third lens L23 for d-line.

The condition formula (8) defines the difference between the Abbe numbers of the materials constituting the first cemented lens on the object side of the aperture stop St, which is a necessary condition to excellently correct the lateral chromatic aberration and the longitudinal chromatic aberration. Further, in the objective lens of the second embodiment, it is necessary that the Abbe number of the negative lens included in the first cemented lens is higher than the Abbe number of the positive lens included in the first cemented lens.

Objective lenses for endoscopes generally have large F numbers to increase the depth of field. Therefore, aberrations, such as spherical aberration and coma aberration, are not important factors to determine the image quality in many cases. One of important factors that degrade the image quality is lateral chromatic aberration. In recent years, the densities of solid-state imaging devices that capture images using objective lenses became higher, and the resolution (pixel number) became higher. Therefore, sufficient correction of the lateral chromatic aberration became necessary. Since the lateral chromatic aberration is more prominent at a position closer to the periphery of the image, excellent correction of the lateral chromatic aberration is extremely effective to improve the image quality in the peripheral area of the image.

Generally, the lateral chromatic aberration is corrected more effectively when an optical member that corrects the lateral chromatic aberration is arranged away from the aperture stop St. Especially, when the optical member is arranged on the image side of the aperture stop St, the lateral chromatic aberration is corrected more effectively as the optical member is closer to the imaging surface. However, in a lens system that has a long back focus of the entire system, it is impossible to arrange the optical member close to the imaging surface. Therefore, it was not easy to correct the lateral chromatic aberration. However, the objective lens of the present embodiment, which adopts the structure of the present embodiment, can realize the long back focus and the excellent correction of the lateral chromatic aberration at the same time.

Next, examples of the numeric values of the objective lens for an endoscope of the present invention will be described. The cross-sectional diagrams of the objective lenses for endoscopes of Examples 1 through 12 are illustrated in FIGS. 1 through 12, respectively. Further, Tables 1 through 12 show lens data about the objective lenses for endoscopes of Examples 1 through 12, respectively.

In the table of lens data for each of the examples, a surface of the most-object-side element is first surface si, and the surface number i (i=1, 2, 3, . . . ) sequentially increases toward the image side. Further, ri represents the curvature radius of the i-th surface, and di represents a distance between the i-th surface and the (i+1)th surface on the optical axis Z. Further, ndj represents a refractive index of the j-th (j=1, 2, 3, . . . ) optical element for d-line (wavelength is 587.6 nm) when the most-object-side lens is the first lens and j sequentially increases toward the image side. Further, vdj represents the Abbe number of the j-th optical element for d-line. In the tables, the curvature radius and the distance between the surfaces are represented by the unit of mm. Further, the sign (plus or minus) of the curvature radius is positive when the surface projects to the object side and negative when the surface projects to the image side. Further, the lens data also includes data about the aperture stop St and the optical member PP, and the term "(aperture stop)" is written in the column of the curvature radius for a surface corresponding to the aperture stop St.

TABLE 1

Example 1

| si | ri | di | ndj | ν dj |
|---|---|---|---|---|
| 1 | 12.500 | 0.350 | 1.88300 | 40.80 |
| 2 | 0.661 | 0.280 | | |
| 3 | 3.700 | 1.040 | 1.92286 | 18.90 |
| 4 | ∞ | 0.035 | | |
| 5 | (aperture stop) | 0.043 | | |
| 6 | −4.192 | 0.825 | 1.71300 | 53.90 |
| 7 | −1.127 | 0.100 | | |
| 8 | 4.435 | 0.900 | 1.62041 | 60.30 |
| 9 | −1.111 | 0.350 | 1.92286 | 18.90 |
| 10 | −2.116 | 0.520 | | |
| 11 | ∞ | 2.400 | 1.51680 | 64.20 |
| 12 | ∞ | | | |

TABLE 2

Example 2

| si | ri | di | ndj | ν dj |
|---|---|---|---|---|
| 1 | 6.667 | 0.350 | 1.88300 | 40.80 |
| 2 | 0.607 | 0.280 | | |
| 3 | 4.393 | 0.914 | 1.92286 | 18.90 |
| 4 | ∞ | 0.035 | | |
| 5 | (aperture stop) | 0.065 | | |
| 6 | −2.815 | 0.855 | 1.71300 | 53.90 |
| 7 | −1.038 | 0.100 | | |
| 8 | 3.099 | 0.900 | 1.62041 | 60.30 |
| 9 | −1.111 | 0.350 | 1.92286 | 18.90 |
| 10 | −2.199 | 0.000 | | |
| 11 | ∞ | 2.400 | 1.51680 | 64.20 |
| 12 | ∞ | | | |

TABLE 3

Example 3

| si | ri | di | ndj | ν dj |
|---|---|---|---|---|
| 1 | 7.200 | 0.350 | 1.88300 | 40.80 |
| 2 | 0.628 | 0.360 | | |
| 3 | 5.340 | 0.840 | 1.92286 | 18.90 |
| 4 | ∞ | 0.035 | | |
| 5 | (aperture stop) | 0.021 | | |

TABLE 3-continued

Example 3

| si | ri | di | ndj | ν dj |
|---|---|---|---|---|
| 6 | −8.730 | 1.160 | 1.71300 | 53.90 |
| 7 | −1.199 | 0.100 | | |
| 8 | 3.547 | 0.900 | 1.62041 | 60.30 |
| 9 | −1.111 | 0.350 | 1.92286 | 18.90 |
| 10 | −2.329 | 0.300 | | |
| 11 | ∞ | 2.400 | 1.51680 | 64.20 |
| 12 | ∞ | | | |

TABLE 4

Example 4

| si | ri | di | ndj | ν dj |
|---|---|---|---|---|
| 1 | 6.667 | 0.400 | 1.88300 | 40.80 |
| 2 | 0.612 | 0.314 | | |
| 3 | 5.216 | 1.210 | 1.92286 | 18.90 |
| 4 | ∞ | 0.035 | | |
| 5 | (aperture stop) | 0.048 | | |
| 6 | −3.771 | 0.600 | 1.71300 | 53.90 |
| 7 | −1.188 | 0.100 | | |
| 8 | 2.280 | 0.360 | 1.92286 | 18.90 |
| 9 | 1.157 | 0.900 | 1.62041 | 60.30 |
| 10 | −2.333 | 0.377 | | |
| 11 | ∞ | 2.400 | 1.51680 | 64.20 |
| 12 | ∞ | | | |

TABLE 5

Example 5

| si | ri | di | ndj | ν dj |
|---|---|---|---|---|
| 1 | 7.777 | 0.400 | 1.88300 | 40.80 |
| 2 | 0.578 | 0.280 | | |
| 3 | 6.300 | 1.120 | 1.92286 | 18.90 |
| 4 | ∞ | 0.035 | | |
| 5 | (aperture stop) | 0.046 | | |
| 6 | −3.924 | 0.602 | 1.71300 | 53.90 |
| 7 | −1.120 | 0.100 | | |
| 8 | 2.350 | 0.360 | 1.92286 | 18.90 |
| 9 | 1.157 | 0.900 | 1.62041 | 60.30 |
| 10 | −2.180 | 0.000 | | |
| 11 | ∞ | 2.400 | 1.51680 | 64.20 |
| 12 | ∞ | | | |

TABLE 6

Example 6

| si | ri | di | ndj | ν dj |
|---|---|---|---|---|
| 1 | 10.529 | 0.400 | 1.88300 | 40.80 |
| 2 | 0.632 | 0.280 | | |
| 3 | 4.462 | 1.200 | 1.92286 | 18.90 |
| 4 | ∞ | 0.035 | | |
| 5 | (aperture stop) | 0.048 | | |
| 6 | −3.808 | 0.600 | 1.71300 | 53.90 |
| 7 | −1.219 | 0.100 | | |
| 8 | 2.282 | 0.360 | 1.92286 | 18.90 |
| 9 | 1.157 | 0.900 | 1.62041 | 60.30 |
| 10 | −2.219 | 0.391 | | |
| 11 | ∞ | 2.400 | 1.51680 | 64.20 |
| 12 | ∞ | | | |

TABLE 7

Example 7

| si | ri | di | ndj | νdj |
|---|---|---|---|---|
| 1 | 6.250 | 0.350 | 1.88300 | 40.80 |
| 2 | 0.675 | 0.500 | | |
| 3 | 30.000 | 0.350 | 1.83481 | 42.71 |
| 4 | 1.058 | 0.600 | 1.84666 | 23.78 |
| 5 | ∞ | 0.035 | | |
| 6 | (aperture stop) | 0.015 | | |
| 7 | −11.966 | 1.150 | 1.71300 | 53.90 |
| 8 | −1.337 | 0.100 | | |
| 9 | 9.138 | 1.000 | 1.62041 | 60.30 |
| 10 | −1.000 | 0.400 | 1.92286 | 18.90 |
| 11 | −1.843 | 0.845 | | |
| 12 | ∞ | 2.400 | 1.51680 | 64.20 |
| 13 | ∞ | | | |

TABLE 8

Example 8

| si | ri | di | ndj | νdj |
|---|---|---|---|---|
| 1 | 6.667 | 0.350 | 1.88300 | 40.80 |
| 2 | 0.647 | 0.407 | | |
| 3 | 11.725 | 0.350 | 1.83481 | 42.71 |
| 4 | 1.14 | 0.600 | 1.84666 | 23.78 |
| 5 | ∞ | 0.035 | | |
| 6 | (aperture stop) | 0.024 | | |
| 7 | −7.384 | 1.236 | 1.71300 | 53.90 |
| 8 | −1.301 | 0.100 | | |
| 9 | 6.04 | 1.000 | 1.71300 | 53.90 |
| 10 | −1.125 | 0.400 | 1.92286 | 18.90 |
| 11 | −2.488 | 0.617 | | |
| 12 | ∞ | 2.400 | 1.51680 | 64.20 |
| 13 | ∞ | | | |

TABLE 9

Example 9

| si | ri | di | ndj | νdj |
|---|---|---|---|---|
| 1 | 5.479 | 0.350 | 1.88300 | 40.80 |
| 2 | 0.731 | 0.365 | | |
| 3 | 10.000 | 0.350 | 1.83481 | 42.71 |
| 4 | 1.000 | 0.600 | 1.75520 | 27.51 |
| 5 | ∞ | 0.035 | | |
| 6 | (aperture stop) | 0.036 | | |
| 7 | −5.000 | 1.270 | 1.71300 | 53.90 |
| 8 | −1.278 | 0.100 | | |
| 9 | 5.774 | 1.000 | 1.62041 | 60.30 |
| 10 | −1.120 | 0.400 | 1.92286 | 18.90 |
| 11 | −2.080 | 0.846 | | |
| 12 | ∞ | 2.400 | 1.51680 | 64.20 |
| 13 | ∞ | | | |

TABLE 10

Example 10

| si | ri | di | ndj | νdj |
|---|---|---|---|---|
| 1 | 5.525 | 0.380 | 1.88300 | 40.80 |
| 2 | 0.566 | 0.305 | | |
| 3 | 10.000 | 0.350 | 1.88300 | 40.80 |
| 4 | 1.000 | 0.780 | 1.80518 | 25.42 |
| 5 | ∞ | 0.035 | | |
| 6 | (aperture stop) | 0.036 | | |
| 7 | −5.000 | 0.600 | 1.71300 | 53.90 |
| 8 | −1.090 | 0.240 | | |
| 9 | 3.668 | 0.350 | 1.92286 | 18.90 |
| 10 | 1.250 | 1.000 | 1.71300 | 53.90 |

TABLE 10-continued

Example 10

| si | ri | di | ndj | νdj |
|---|---|---|---|---|
| 11 | −2.301 | 0.466 | | |
| 12 | ∞ | 2.400 | 1.51680 | 64.20 |
| 13 | ∞ | | | |

TABLE 11

Example 11

| si | ri | di | ndj | νdj |
|---|---|---|---|---|
| 1 | 10.700 | 0.380 | 1.88300 | 40.80 |
| 2 | 0.648 | 0.352 | | |
| 3 | 5.865 | 0.350 | 1.88300 | 40.80 |
| 4 | 1.111 | 0.830 | 1.80810 | 22.76 |
| 5 | ∞ | 0.035 | | |
| 6 | (aperture stop) | 0.036 | | |
| 7 | −5.072 | 0.600 | 1.71300 | 53.90 |
| 8 | −1.217 | 0.100 | | |
| 9 | 3.909 | 0.400 | 1.92286 | 18.90 |
| 10 | 1.286 | 1.000 | 1.71300 | 53.90 |
| 11 | −2.242 | 0.600 | | |
| 12 | ∞ | 2.400 | 1.51680 | 64.20 |
| 13 | ∞ | | | |

TABLE 12

Example 12

| si | ri | di | ndj | νdj |
|---|---|---|---|---|
| 1 | 7.500 | 0.350 | 1.88300 | 40.80 |
| 2 | 0.634 | 0.330 | | |
| 3 | 0.000 | 0.350 | 1.88300 | 40.80 |
| 4 | 1.000 | 1.000 | 1.80810 | 22.76 |
| 5 | −5.000 | 0.000 | | |
| 6 | (aperture stop) | 0.035 | | |
| 7 | ∞ | 0.600 | 1.51680 | 64.20 |
| 8 | −1.359 | 0.100 | | |
| 9 | 3.377 | 0.350 | 1.92286 | 18.90 |
| 10 | 1.065 | 1.000 | 1.63930 | 44.87 |
| 11 | −1.549 | 0.618 | | |
| 12 | ∞ | 2.400 | 1.51680 | 64.20 |
| 13 | ∞ | | | |

In the lens data of Examples 1 through 6, r9 and d9 correspond to $R_{45}$ and $D_5$, respectively, which are in the condition formula (4). In the lens data of Examples 7 through 12, r10 and d10 correspond to $R_{56}$ and $D_6$, respectively, which are in the condition formula (7).

FIGS. 13A through 13D are diagrams illustrating a spherical aberration, a curvature of field, a distortion, and a lateral chromatic aberration (a chromatic aberration of magnification) of the objective lens for an endoscope according to Example 1 of the present invention, respectively. FIGS. 13A through 13D illustrate aberrations for d-line (wavelength is 587.6 nm), as a reference wavelength. In FIGS. 13A and 13D, which illustrate the spherical aberration and the lateral chromatic aberration respectively, aberrations with respect to F-line (wavelength is 486.1 nm) and C-line (wavelength is 656.3 nm) are also illustrated. In FIG. 13C, which illustrates the distortion, an ideal image height f sin θ is obtained by using focal length f of the entire system and half angle of view θ (which is a variable, and 0>θ≦ω). Further, differences (shift amounts) from the ideal image height f sin θ are illustrated.

Similarly, FIGS. 14A through 14D, FIGS. 15A through 15D, FIGS. 16A through 16D, FIGS. 17A through 17D, FIGS. 18A through 18D, FIGS. 19A through 19D, FIGS. 20A through 20D, FIGS. 21A through 21D, FIGS. 22A through 22D, FIGS. 23A through 23D, and FIGS. 24A through 24D illustrate a spherical aberration, a curvature of field, a distortion, and a lateral chromatic aberration (a chromatic aberration of magnification) of the objective lens for an endoscope according to each of Examples 2 through 12 of the present invention. As the diagrams show, the aberrations are efficiently corrected in Examples 2 through 12.

Figure 25:
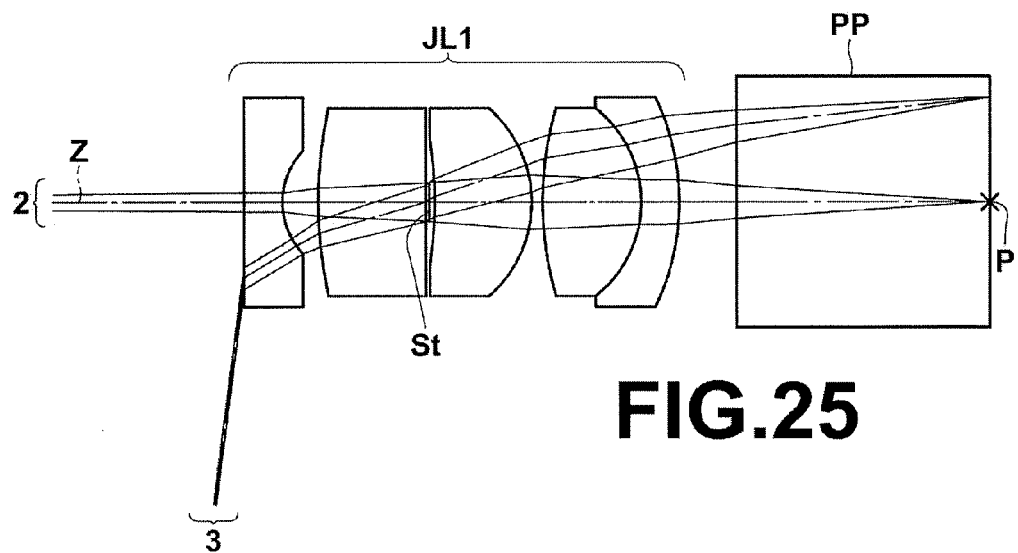
FIG. 25 is a cross-sectional diagram illustrating the structure of an objective lens for an endoscope according to Conventional Example 1.
Figure 26:
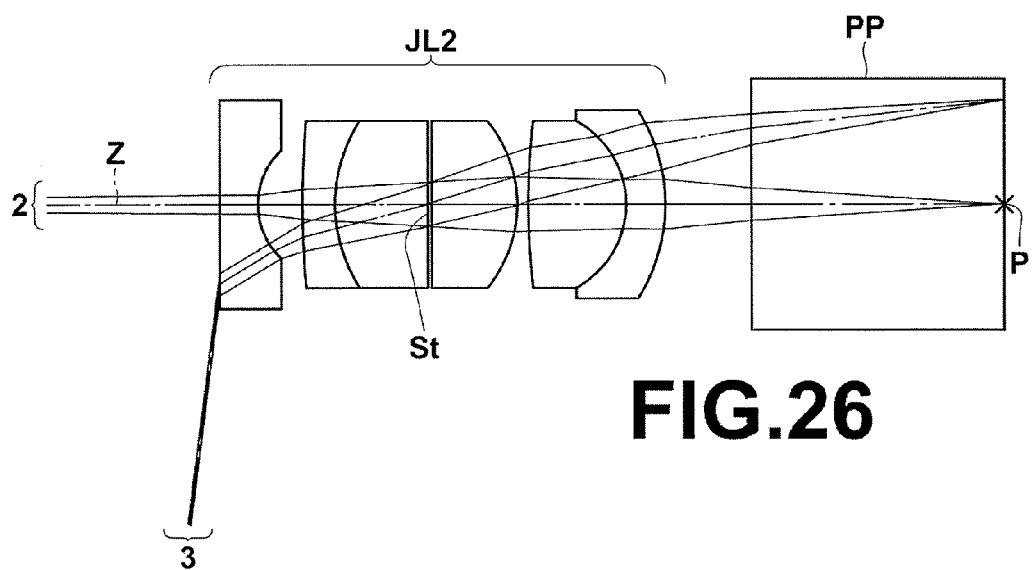
FIG. 26 is a cross-sectional diagram illustrating the structure of an objective lens for an endoscope according to Conventional Example 2.

Meanwhile, FIGS. 25 and 26 are cross-sectional diagrams of conventional-type objective lenses for endoscopes. Conventional-type objective lens JL1 for an endoscope of Conventional Example 1, illustrated in FIG. 25, has 4-group/5-element structure. In the 4-group/5-element structure, a negative first lens, a positive second lens, a positive third lens, and a cemented lens composed of a positive fourth lens and a negative fifth lens, which are joined together, are arranged in order from the object side. A flat surface of the negative first lens faces the object side, and a surface of the positive third lens, the surface having a curvature radius the absolute value of which is greater than that of the other surface, faces the object side. Further, aperture stop St is arranged between the second lens and the third lens.

Conventional-type objective lens JL2 for an endoscope of Conventional Example 2, illustrated in FIG. 26, has 4-group/6-element structure. In the 4-group/6-element structure, a negative first lens, a first cemented lens composed of a negative second lens and a positive third lens, which are joined together, a positive fourth lens, and a second cemented lens composed of a positive fifth lens and a negative sixth lens, which are joined together, are arranged in order from the object side. A flat surface of the negative first lens faces the object side, and a flat surface of the positive fourth lens faces the object side. Further, aperture stop St is arranged between the first cemented lens and the fourth lens.

In FIGS. 25 and 26, the left side is the object side and the right side is the image side in a manner similar to FIG. 1. Further, in FIGS. 25 and 26, an axial beam 2 and an off-axial beam 3 that corresponds to the maximum image height, and optical member PP, which is arranged on the image side of the most-image-side lens, are illustrated together with the objective lens for an endoscope. The optical member PP corresponds to an optical path conversion prism.

Tables 13 and 14 show lens data about objective lenses for endoscopes of Conventional Example 1 and Conventional Example 2 respectively. In Tables 13 and 14, the meanings of the signs are similar to those of the signs in the lens data of Examples 1 through 12, described above.

TABLE 13

| Conventional Example 1 | | | | |
|---|---|---|---|---|
| si | ri | di | ndj | ν dj |
| 1 | ∞ | 0.360 | 1.88300 | 40.80 |
| 2 | 0.723 | 0.340 | | |
| 3 | 4.285 | 1.008 | 1.92286 | 18.90 |
| 4 | ∞ | 0.035 | | |
| 5 | (aperture stop) | 0.051 | | |
| 6 | −3.752 | 0.916 | 1.71300 | 53.90 |
| 7 | −1.209 | 0.103 | | |
| 8 | 3.283 | 0.926 | 1.62041 | 60.30 |
| 9 | −1.157 | 0.360 | 1.92286 | 18.90 |
| 10 | −2.342 | 0.539 | | |
| 11 | ∞ | 2.400 | 1.51680 | 64.20 |
| 12 | ∞ | | | |

TABLE 14

| Conventional Example 2 | | | | |
|---|---|---|---|---|
| si | ri | di | ndj | ν dj |
| 1 | ∞ | 0.360 | 1.88300 | 40.80 |
| 2 | 0.721 | 0.415 | | |
| 3 | 9.215 | 0.308 | 1.80400 | 46.57 |
| 4 | 1.509 | 0.872 | 1.84666 | 23.78 |
| 5 | ∞ | 0.035 | | |
| 6 | (aperture stop) | 0.000 | | |
| 7 | ∞ | 0.810 | 1.62041 | 60.30 |
| 8 | −1.282 | 0.102 | | |
| 9 | 6.895 | 0.923 | 1.62041 | 60.30 |
| 10 | −0.915 | 0.369 | 1.92286 | 18.90 |
| 11 | −1.704 | 0.809 | | |
| 12 | ∞ | 2.400 | 1.51680 | 64.20 |
| 13 | ∞ | | | |

Figures 27A, 27B, 27C, 27D:
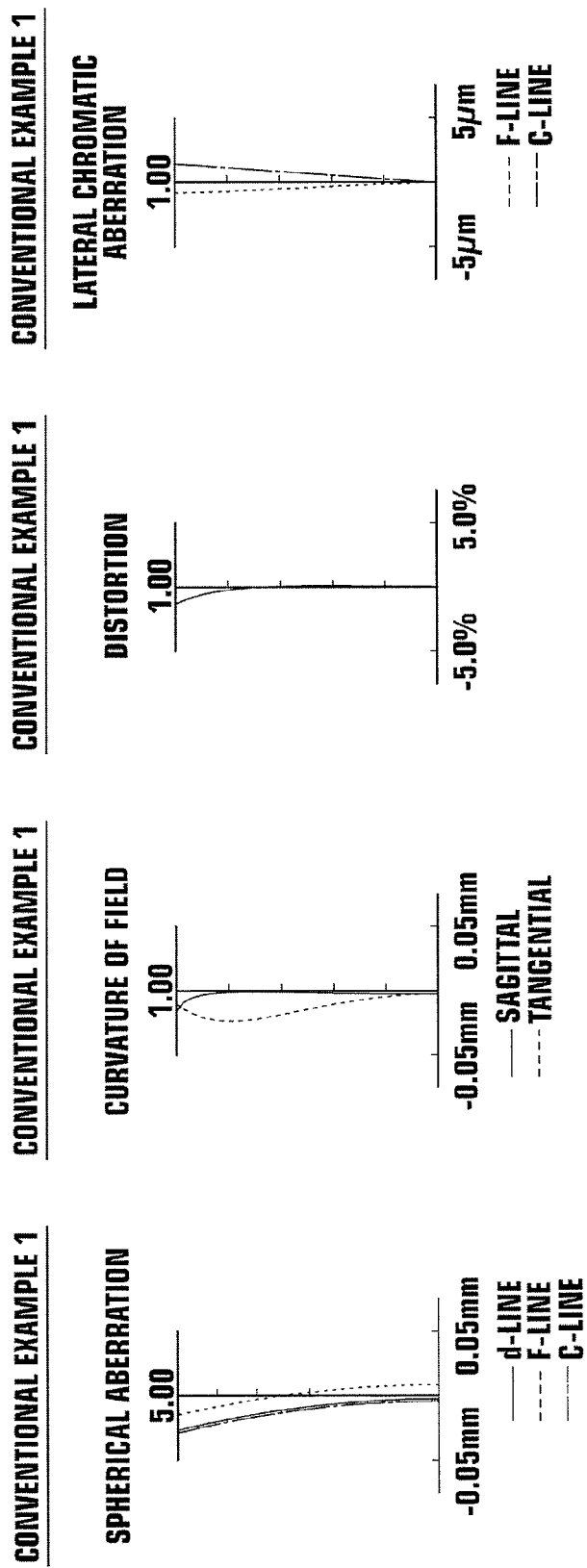
FIG. 27A is a diagram illustrating the spherical aberration of the objective lens for an endoscope according to Conventional Example 1.
FIG. 27B is a diagram illustrating the curvature of field of the objective lens for an endoscope according to Conventional Example 1.
FIG. 27C is a diagram illustrating the distortion of the objective lens for an endoscope according to Conventional Example 1.
FIG. 27D is a diagram illustrating the lateral chromatic aberration of the objective lens for an endoscope according to Conventional Example 1.

FIGS. 27A through 27D and FIGS. 28A through 28D illustrate a spherical aberration, a curvature of field, a distortion, and a lateral chromatic aberration (a chromatic aberration of magnification) of the objective lens for an endoscope according to each of Conventional Examples 1 and 2. FIGS. 27A through 27D and FIGS. 28A through 28D are illustrated in a manner similar to the diagrams illustrating aberrations of Examples 1 through 12, described above. In FIGS. 27C and 28C, which illustrate distortions, an ideal image height f sin θ is obtained using focal length f of the entire system and half angle of view θ (which is a variable, and $0 \leq \theta \leq \omega$). Further, differences (shift amounts) from the ideal image height f sin θ are illustrated. When the diagrams illustrating the aberrations of Examples 1 through 12 and the diagrams illustrating the aberrations of Conventional Examples 1 and 2 are compared with each other, the tendencies of distortions differ from each other. When a notation method in which an ideal image height is represented by f tan θ (f: focal length of entire system, θ: half angle of view), and which is used to express the distortion of an imaging lens having a general angle of view, is used, the aberrations of Conventional Examples 1 and 2 are largely negative.

Further, Table 15 illustrates various kinds of data of Examples 1 through 6 and Conventional Example 1. Table 16 illustrates various kinds of data of Examples 7 through 12 and Conventional Example 2. Tables 15 and 16 show data for d-line, and all of the lengths are represented by the unit of mm. Further, all of the angles are represented by the unit of degrees.

TABLE 15

|  |  | Example 1 | Example 2 | Example 3 | Example 4 | Example 5 | Example 6 | Conventional Example 1 |
|---|---|---|---|---|---|---|---|---|
|  | Number of Components | 4-Group 5-Element | 4-Group 5-Element | 4-Group 5-Element | 4-Group 5-Element | 4-Group 5-Element | 4-Group 5-Element | 4-Group 5-Element |
|  | Rear-Group Cemented Lens | P/N | P/N | P/N | N/P | N/P | N/P | P/N |
|  | Object Surface | Flat | Flat | Spherical | Flat | Flat | Spherical | Flat |
|  | Imaging Magnification Ratio | −0.080 | −0.080 | −0.082 | −0.080 | −0.080 | −0.088 | −0.080 |
|  | Object Distance | 11.83 | 10.35 | 10.00 | 10.76 | 10.23 | 10.00 | 11.40 |
|  | Maximum Image Height | 1.00 | 1.00 | 1.00 | 1.00 | 1.00 | 1.00 | 1.00 |
|  | Full Angle of View | 134.93 | 164.65 | 164.06 | 144.83 | 164.75 | 145.03 | 165.38 |
|  | Focal Length f | 0.981 | 0.865 | 0.863 | 0.900 | 0.856 | 0.924 | 0.948 |
|  | Bf | 2.022 | 1.813 | 1.808 | 1.847 | 1.835 | 1.888 | 2.044 |
|  | Effective F-Number | 5.597 | 5.002 | 5.033 | 5.419 | 5.007 | 5.396 | 5.002 |
|  | Aperture Diameter | 0.332 | 0.324 | 0.33 | 0.348 | 0.364 | 0.352 | 0.372 |
|  | $R_1$ | 12.5 | 6.667 | 7.2 | 6.667 | 7.377 | 10.529 | Flat |
|  | $\nu_1$ | 40.80 | 40.80 | 40.80 | 40.80 | 40.80 | 40.80 | 40.80 |
|  | $\nu_2$ | 18.90 | 18.90 | 18.90 | 18.90 | 18.90 | 18.90 | 18.90 |
|  | $\nu_3$ | 53.90 | 53.90 | 53.90 | 53.90 | 53.90 | 53.90 | 53.90 |
|  | $\nu_4$ | 60.30 | 60.30 | 60.30 | 18.90 | 18.90 | 18.90 | 60.30 |
|  | $\nu_5$ | 18.90 | 18.90 | 18.90 | 60.30 | 60.30 | 60.30 | 18.90 |
|  | $|R_{45}|$ | 1.111 | 1.111 | 1.111 | 1.157 | 1.157 | 1.157 | 1.157 |
|  | $D_5$ | 0.35 | 0.35 | 0.35 | 0.9 | 0.9 | 0.9 | 0.36 |
|  | $n_5$ | 1.92286 | 1.92286 | 1.92286 | 1.62041 | 1.62041 | 1.62041 | 1.92286 |
|  | $\theta 8$ | 49.804 | 57.705 | 57.736 | 53.837 | 57.893 | 52.913 | 53.812 |
|  | $\theta 10$ | 67.465 | 82.323 | 82.032 | 72.416 | 82.376 | 72.517 | 82.688 |
| (1) | $\theta 8/\theta 10$ | 0.738 | 0.701 | 0.704 | 0.743 | 0.703 | 0.730 | 0.651 |
| (2) | $R_1/f$ | 12.740 | 7.707 | 8.345 | 7.408 | 9.087 | 11.394 | — |
| (3) | $Bf/f$ | 2.060 | 2.096 | 2.096 | 2.052 | 2.144 | 2.043 | 2.155 |
| (4) | $\dfrac{f^2 \times |\nu_4 - \nu_5|}{|R_{45}| \times (Bf + D_5/n_5)}$ | 16.280 | 13.976 | 13.937 | 12.066 | 10.962 | 12.504 | 14.429 |
| (5) | $\nu_2 + \nu_n$ | 37.800 | 37.800 | 37.800 | 37.800 | 37.800 | 37.800 | 37.800 |

TABLE 16

|  | Example 7 | Example 8 | Example 9 | Example 10 | Example 11 | Example 12 | Conventional Example 2 |
|---|---|---|---|---|---|---|---|
| Number of Components | 4-Group 6-Element | 4-Group 6-Element | 4-Group 6-Element | 4-Group 6-Element | 4-Group 6-Element | 4-Group 6-Element | 4-Group 6-Element |
| Rear-Group Cemented Lens | P/N | P/N | P/N | N/P | N/P | N/P | P/N |
| Object Surface | Flat | Flat | Spherical | Flat | Flat | Spherical | Flat |
| Imaging Magnification Ratio | −0.080 | −0.080 | −0.089 | −0.080 | −0.080 | −0.080 | −0.080 |
| Object Distance | 10.75 | 10.10 | 10.00 | 9.84 | 10.71 | 10.00 | 11.21 |
| Maximum Image Height | 1.00 | 1.00 | 1.00 | 1.00 | 1.00 | 1.00 | 1.00 |
| Full Angle of View | 144.59 | 164.71 | 134.66 | 164.95 | 154.83 | 164.52 | 165.39 |
| Focal Length f | 0.906 | 0.853 | 0.944 | 0.828 | 0.897 | 0.837 | 0.937 |
| Bf | 2.359 | 2.132 | 2.344 | 1.979 | 2.108 | 2.134 | 2.314 |
| Effective F-Number | 5.42 | 4.978 | 5.642 | 5.01 | 5.202 | 5.602 | 4.998 |
| Aperture Diameter | 0.36 | 0.356 | 0.32 | 0.376 | 0.384 | 0.364 | 0.424 |
| $R_1$ | 6.25 | 6.667 | 5.479 | 5.525 | 10.7 | 7.5 | Flat |
| $\nu_1$ | 40.80 | 40.80 | 40.80 | 40.80 | 40.80 | 40.80 | 40.80 |
| $\nu_2$ | 42.71 | 42.71 | 42.71 | 40.80 | 40.80 | 40.80 | 46.57 |
| $\nu_3$ | 23.78 | 23.78 | 27.51 | 25.42 | 22.76 | 22.76 | 23.78 |
| $\nu_4$ | 53.90 | 53.90 | 53.90 | 53.90 | 53.90 | 64.20 | 60.30 |
| $\nu_5$ | 60.30 | 53.90 | 60.30 | 18.90 | 18.90 | 18.90 | 60.30 |
| $\nu_6$ | 18.90 | 18.90 | 18.90 | 53.90 | 53.90 | 44.87 | 18.90 |
| $|R_{56}|$ | 1 | 1.125 | 1.12 | 1.25 | 1.286 | 1.065 | 0.915 |
| $D_6$ | 0.4 | 0.4 | 0.4 | 1 | 1 | 1 | 0.369 |
| $n_6$ | 1.92286 | 1.92286 | 1.92286 | 1.713 | 1.713 | 1.6393 | 1.92286 |
| $\theta 8$ | 53.846 | 58.367 | 51.088 | 59.432 | 55.191 | 58.746 | 54.188 |
| $\theta 10$ | 72.294 | 82.354 | 67.328 | 82.477 | 77.415 | 82.259 | 82.696 |

TABLE 16-continued

|   |   | Example 7 | Example 8 | Example 9 | Example 10 | Example 11 | Example 12 | Conventional Example 2 |
|---|---|---|---|---|---|---|---|---|
| (1) | θ8/θ10 | 0.745 | 0.709 | 0.759 | 0.721 | 0.713 | 0.714 | 0.655 |
| (2) | $R_1/f$ | 6.897 | 7.816 | 5.802 | 6.671 | 11.931 | 8.964 | — |
| (6) | Bf/f | 2.603 | 2.499 | 2.482 | 2.389 | 2.351 | 2.550 | 2.469 |
| (7) | $\dfrac{f^2 \times \lvert v_5 - v_6 \rvert}{\lvert R_{56} \rvert \times (Bf + D_6/n_6)}$ | 13.247 | 11.495 | 12.919 | 7.494 | 8.131 | 6.221 | 15.858 |
| (8) | $\lvert v_2 - v_3 \rvert$ | 18.930 | 15.200 | 15.200 | 15.380 | 18.040 | 18.040 | 22.790 |

Next, terms used in Tables 15 and 16 will be summarized. The term "Number of Components" represents the number of lens groups and the number of lenses constituting each lens system. The term "Rear-Group Cemented Lens" represents the sign (plus or minus) of refractive power of lenses constituting a cemented lens on the rear side of the aperture stop St and the order of arrangement of the lenses. For example, the term "P/N" (positive lens/negative lens) means that a positive lens and a negative lens are arranged in order from the object side. The term "N/P" (negative lens/positive lens) means that a negative lens and a positive lens are arranged in order from the object side. The term "Object Surface" represents the form of an object surface. The term "Object Distance" represents a distance from a most-object-side lens surface to the object in the direction of the optical axis. The term "Imaging Magnification Ratio" represents a lateral magnification ratio when an object is located at the aforementioned "Object Distance". The term "Maximum Image Height" is the highest image height. The term "Full Angle of View" is a so-called angle of view, which is represented by 2ω.

The term "Focal Length f" is the focal length of the entire system. The sign "Bf" represents an air-converted back focus. The term "Effective F-Number" represents an effective F-number. The term "Aperture Diameter" represents the diameter of aperture stop St. Further, signs "$R_1$", "$v_2$", "$v_3$", "$v_4$", "$v_5$", "$v_n$", "$R_{45}$", "$R_{56}$", "$D_5$", "$D_6$", "$n_5$", "$n_6$", "θ8", and "θ10" are defined in the aforementioned condition formulas. Further, the sign "$v_1$" represents the Abbe number of the first lens for d-line, and the sign "$v_6$" represents the Abbe number of the sixth lens for d-line.

In the lower part of Table 15, values corresponding to the condition formulas (1) through (5) are shown. All of Examples 1 through 6 satisfy the condition formulas (1) through (5). However, Conventional Example 1 does not satisfy the condition formula (1). In the lower part of Table 16, values corresponding to the condition formulas (1), (2), (6), (7) and (8) are shown. All of Examples 7 through 12 satisfy the condition formulas (1), (2), (6), (7) and (8). However, Conventional Example 2 does not satisfy the condition formula (1).

In Table 17, numerical data representing relationships between image heights and angles of view in Examples 1 through 12, Conventional Examples 1 and 2, and an optical system using an equidistant projection method are shown. In Table 17, half angles of view for respective image heights are shown in the section titled "Half Angle of View". Specifically, the term "20%-Image-Height Angle of View" represents the half angle of view when the image height is 20% of the maximum image height. The term "40%-Image-Height Angle of View" represents the half angle of view when the image height is 40% of the maximum image height. The term "60%-Image-Height Angle of View" represents the half angle of view when the image height is 60% of the maximum image height. The term "80%-Image-Height Angle of View" represents the half angle of view when the image height is 80% of the maximum image height. Further, the term "Maximum Angle of View" represents the maximum half angle of view determined by the specification and the like of each lens system, which corresponds to ω illustrated in the cross-sectional diagrams of the lenses. Further, all of the "20%-Image-Height Angle of View", "40%-Image-Height Angle of View", "60%-Image-Height Angle of View", "80%-Image-Height Angle of View", and the "Maximum Angle of View" are represented by the unit of degrees.

TABLE 17

|   | Example 1 | Example 2 | Example 3 | Example 4 | Example 5 | Example 6 | Example 7 | Example 8 | Example 9 |
|---|---|---|---|---|---|---|---|---|---|
| <Half Angle of View> |  |  |  |  |  |  |  |  |  |
| 20%-Image-Height Angle of View | 11.55 | 13.14 | 13.19 | 12.56 | 13.24 | 12.22 | 12.57 | 13.38 | 12.06 |
| 40%-Image-Height Angle of View | 23.38 | 26.67 | 26.75 | 25.40 | 26.84 | 24.74 | 25.43 | 27.11 | 24.36 |
| 60%-Image-Height Angle of View | 35.88 | 41.12 | 41.21 | 38.92 | 41.33 | 38.02 | 38.95 | 41.74 | 37.19 |
| 80%-Image-Height Angle of View | 49.80 | 57.70 | 57.74 | 53.84 | 57.89 | 52.91 | 53.85 | 58.37 | 51.09 |
| Maximum Angle of View | 67.47 | 82.32 | 82.03 | 72.42 | 82.38 | 72.52 | 72.29 | 82.35 | 67.33 |
| <Half Angle of View/ Maximum Half Angle of View> |  |  |  |  |  |  |  |  |  |
| 20%-Image-Height Angle-of-View Ratio | 0.171 | 0.160 | 0.161 | 0.173 | 0.161 | 0.168 | 0.174 | 0.162 | 0.179 |
| 40%-Image-Height Angle-of-View Ratio | 0.347 | 0.324 | 0.326 | 0.351 | 0.326 | 0.341 | 0.352 | 0.329 | 0.362 |
| 60%-Image-Height Angle-of-View Ratio | 0.532 | 0.499 | 0.502 | 0.537 | 0.502 | 0.524 | 0.539 | 0.507 | 0.552 |
| 80%-Image-Height Angle-of-View Ratio | 0.738 | 0.701 | 0.704 | 0.743 | 0.703 | 0.730 | 0.745 | 0.709 | 0.759 |

|   | Example 10 | Example 11 | Example 12 | Conventional Example 1 | Conventional Example 2 | Equidistant Projection |
|---|---|---|---|---|---|---|
| <Half Angle of View> |  |  |  |  |  |  |
| 20%-Image-Height Angle of View | 13.71 | 12.64 | 13.57 | 11.98 | 12.13 | 20% ANGLE OF VIEW |
| 40%-Image-Height Angle of View | 27.78 | 25.63 | 27.48 | 24.33 | 24.66 | 40% ANGLE OF VIEW |

TABLE 17-continued

| | | | | | | |
|---|---|---|---|---|---|---|
| 60%-Image-Height Angle of View | 42.68 | 39.46 | 42.19 | 37.83 | 38.20 | 60% ANGLE OF VIEW |
| 80%-Image-Height Angle of View | 59.43 | 55.19 | 58.75 | 53.81 | 54.19 | 80% ANGLE OF VIEW |
| Maximum Angle of View | 82.48 | 77.41 | 82.26 | 82.69 | 82.70 | MAXIMUM ANGLE OF VIEW |
| <Half Angle of View/ Maximum Half Angle of View> | | | | | | |
| 20%-Image-Height Angle-of-View Ratio | 0.166 | 0.163 | 0.165 | 0.145 | 0.147 | 0.200 |
| 40%-Image-Height Angle-of-View Ratio | 0.337 | 0.331 | 0.334 | 0.295 | 0.298 | 0.400 |
| 60%-Image-Height Angle-of-View Ratio | 0.517 | 0.518 | 0.513 | 0.458 | 0.462 | 0.600 |
| 80%-Image-Height Angle-of-View Ratio | 0.721 | 0.713 | 0.714 | 0.651 | 0.655 | 0.800 |

In Table 17, the section titled "Half Angle of View/Maximum Half Angle of View" shows the ratio of a half angle of view to the maximum half angle of view for each image height. Specifically, the ratio is a numerical value obtained by normalizing the half angle of view for each image height by the maximum half angle of view.

In Table 17, the "20%-Image-Height Angle-of-View Ratio" is obtained by dividing the "20%-Image-Height Angle of View" in Table 17 by the "Maximum Angle of View" in Table 17. The "40%-Image-Height Angle-of-View. Ratio" is obtained by dividing the "40%-Image-Height Angle of View" in Table 17 by the "Maximum Angle of View" in Table 17. The "60%-Image-Height Angle-of-View Ratio" is obtained by dividing the "60%-Image-Height Angle of View" in Table 17 by the "Maximum Angle of View" in Table 17. The "80%-Image-Height Angle-of-View. Ratio" is obtained by dividing the "80%-Image-Height Angle of View" in Table 17 by the "Maximum Angle of View" in Table 17.

Figure 29:
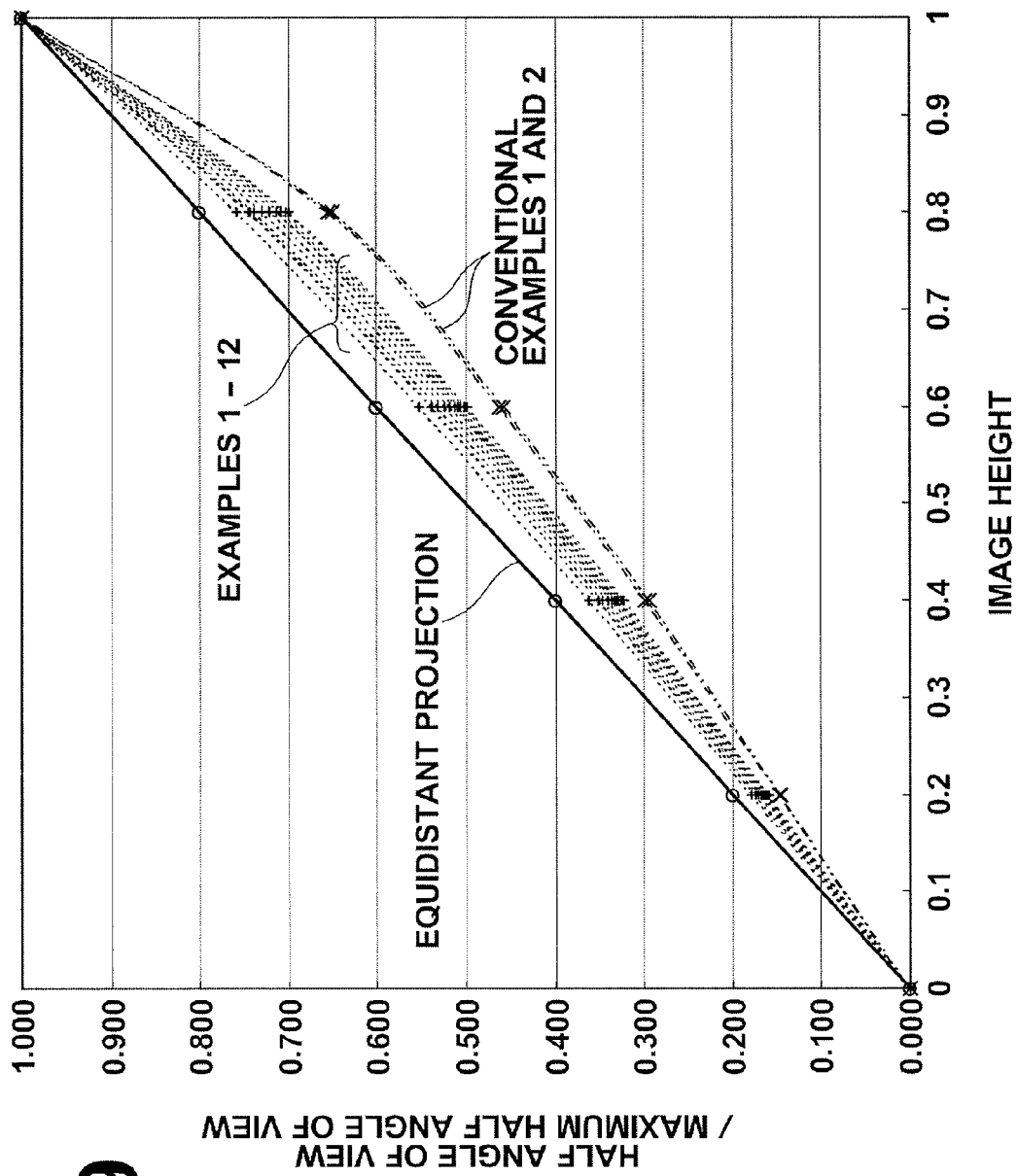
FIG. 29 is a diagram illustrating relationships between image heights and angles of view.

FIG. 29 is a diagram illustrating relationships between image heights and angles of view in Examples 1 through 12, Conventional Examples 1 and 2, and the optical system of the equidistant projection method. FIG. 29 is based on the numerical data in Table 17. In FIG. 29, the horizontal axis represents image heights, and the vertical axis represents the ratio of a half angle of view to the maximum half angle of view. In FIG. 29, the relationship for the optical system of the equidistant projection method is illustrated using a solid line, and the relationships for Examples 1 through 12 are illustrated using broken lines. Further, the relationships for Conventional Examples 1 and 2 are illustrated using double-dot-dashed lines. In FIG. 29, the curves of Examples 1 through 12 of the present invention are closer to the curve of the optical system of the equidistant projection method, compared with the curves of Conventional Examples 1 and 2. This shows that in Examples 1 through 12 of the present invention, images in the peripheral areas are improved, compared with the conventional examples.

Figure 30:
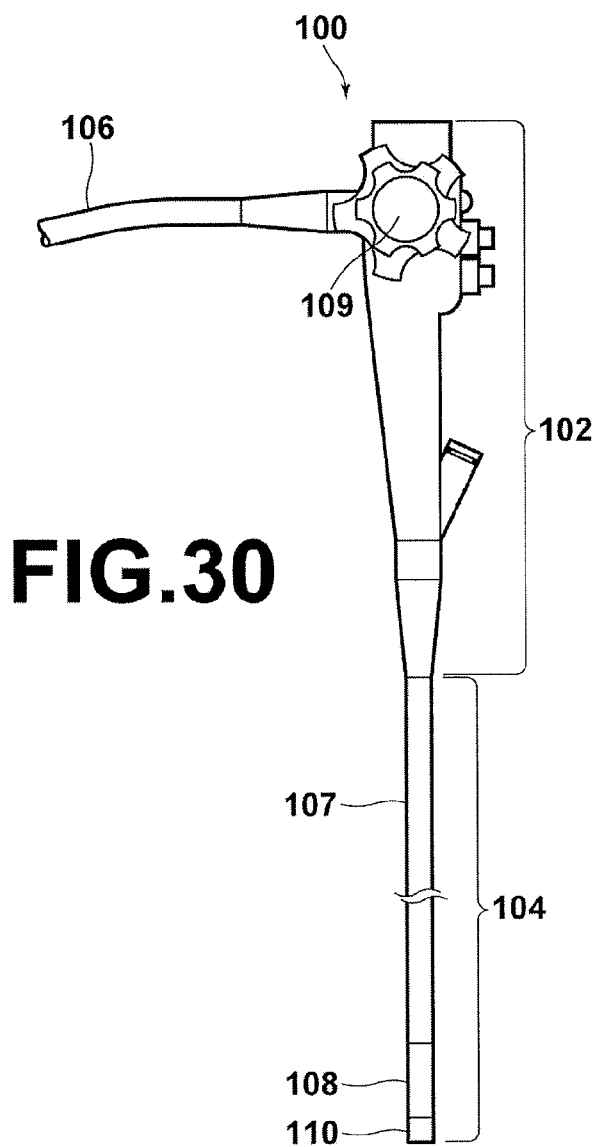
FIG. 30 is a schematic diagram illustrating the structure of an endoscope according to an embodiment of the present invention.
Figure 31:
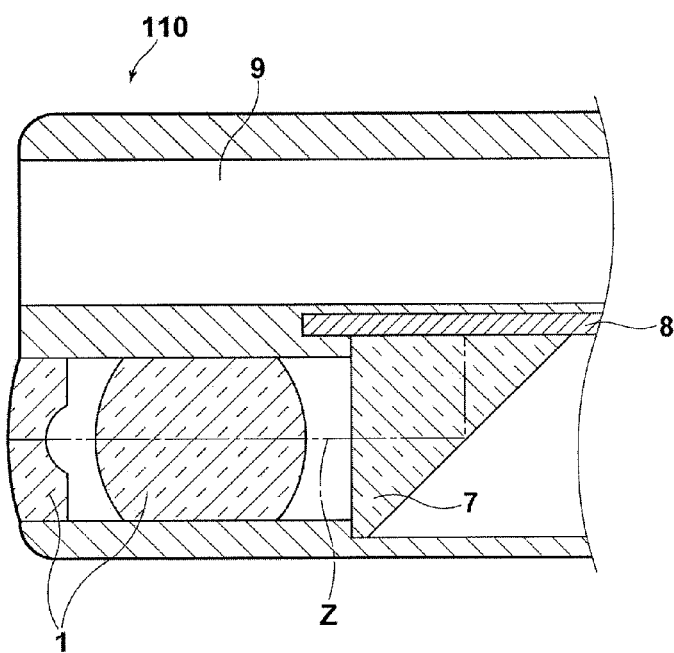
FIG. 31 is a cross-sectional diagram illustrating a main part of a leading-end hard portion of an endoscope.
Figure 32:
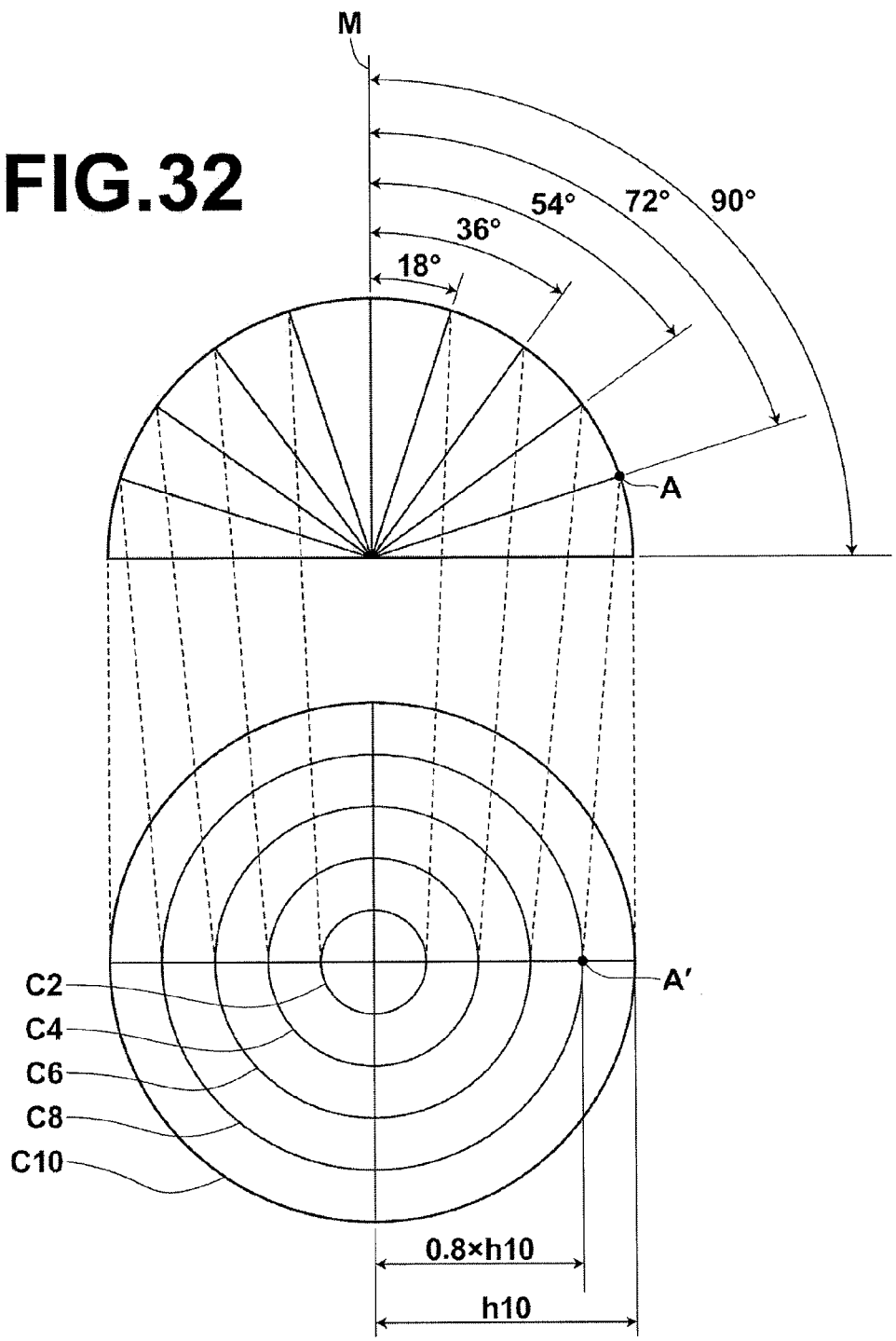
FIG. 32 is a schematic diagram illustrating relationships between angles of view and image heights in an optical system of an equidistant projection method.
Figure 33:
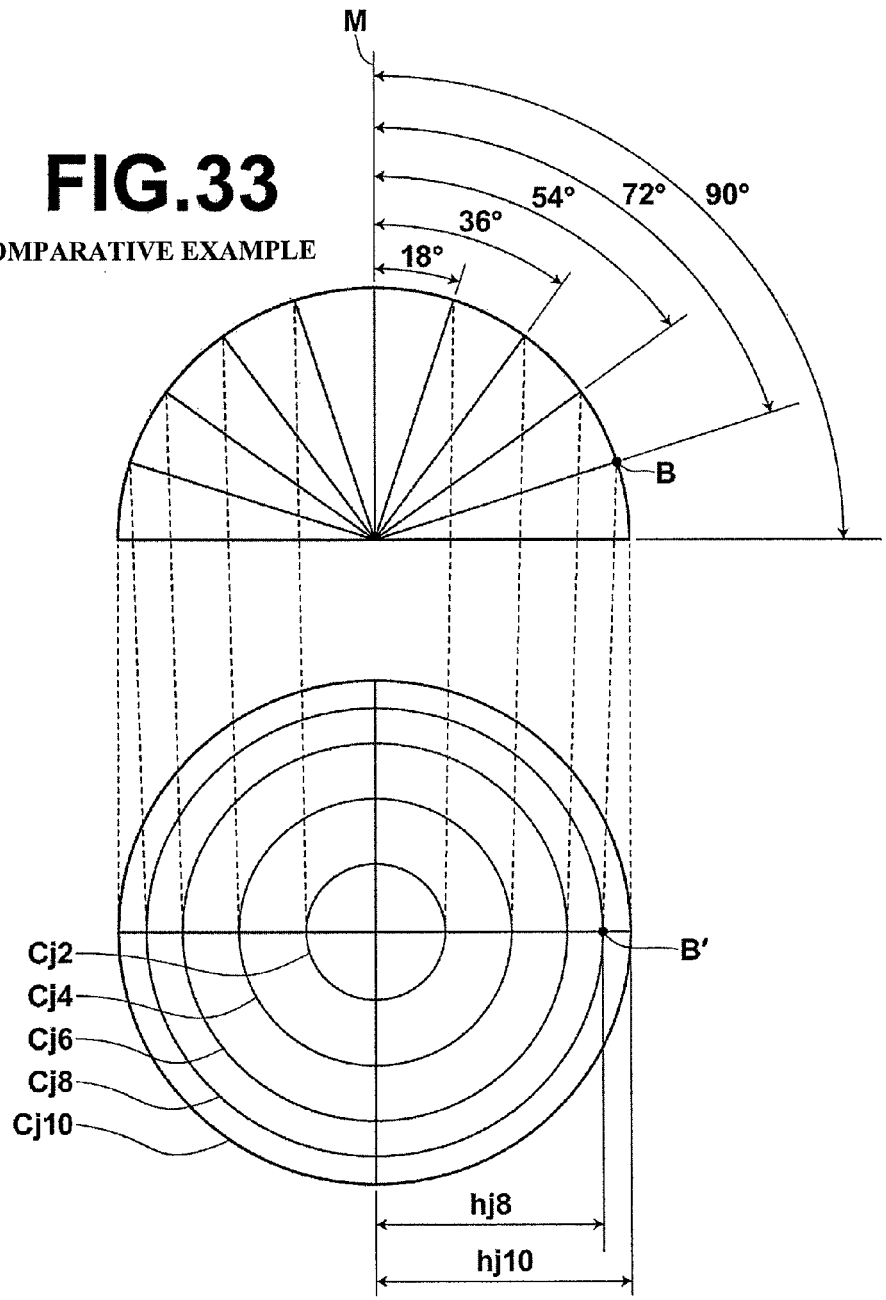
FIG. 33 is a schematic diagram illustrating relationships between angles of view and image heights in a conventional-type objective lens for an endoscope.

Next, an example of an endoscope adopting the objective lens for an endoscope according to the embodiments of the present invention will be described with reference to FIGS. 30 and 31. FIG. 30 is a schematic diagram illustrating the whole endoscope. FIG. 31 is a schematic cross-sectional diagram illustrating the structure of the endoscope when the objective lens for an endoscope is arranged at the leading end of the insertion portion of the endoscope.

As illustrated in FIG. 30, an endoscope 100 basically includes an operation unit 102, an insertion portion 104, and a connector unit (not illustrated) for drawing a universal code 106. The leading end of the operation unit 102 is connected to the insertion portion 104, which is inserted into the body of a patient. Further, the universal code 106 for connecting a light source apparatus or the like to the connector unit is drawn from the base end side (which is opposite to the leading end side) of the operation unit 102.

The substantial part of the insertion portion 104 is a soft portion (flexible portion) 107, which curves (or bends) in an arbitrary direction along the insertion path thereof. The leading end of the soft portion 107 is connected to a bend portion 108, and a leading end hard portion 110 is connected to the leading end of the bend portion 108. The bend portion 108 is provided to direct the leading end hard portion 110 to a desirable direction. The bend portion 108 can be bent and operated by rotating a bend scan knob 109 provided in the operation unit 102.

FIG. 31 is a cross-sectional diagram illustrating a main part of the leading-end hard portion 110 of the objective lens 1 for an endoscope at a cross section including optical axis Z. FIG. 31 does not illustrate the actual form of the objective lens 1 for an endoscope but the concept of the lens. As illustrated in FIG. 31, the objective lens 1 for an endoscope, an optical path conversion prism 7, and a solid-state imaging device 8 are arranged in the leading-end hard portion 110. The optical axis of the objective lens 1 for an endoscope is arranged parallel to the direction of the axis of the leading-end hard portion 110. The optical path conversion prism 7 is provided to bend the image-side optical path of the objective lens 1 for an endoscope by 90 degrees. Further, the solid-state imaging device 8 is attached to the optical path conversion prism 7 in such a manner that the light receiving surface of the solid-state imaging device 8 is parallel to the longitudinal axis direction of the insertion portion 104. When the solid-state imaging device 8 is arranged in such a manner, the lower half of the leading-end hard portion 110, illustrated in FIG. 31, structures a direct-observation-type observation optical system. Further, the upper half of the leading-end hard portion 110 structures a treatment tool insertion channel 9. Accordingly, a multiplicity of elements are arranged in the insertion portion that has a small diameter.

Further, the solid-state imaging device 8 includes a cover glass for protecting the light receiving surface thereof. In FIG. 31, the solid-state imaging device 8 is illustrated as a device including the cover glass. As illustrated in FIG. 31, it is necessary that the objective lens for an endoscope has a long back focus to arrange the optical path conversion prism 7 between the objective lens 1 for an endoscope and the imaging surface. Therefore, the objective lens for an endoscope in each of the embodiments is appropriate to be as the objective lens for an endoscope.

So far, the present invention was described using the embodiments and the examples. However, the present invention is not limited to the embodiments and the examples, and various modifications are possible. For example, values, such as the curvature radius of each lens element, a distance between surfaces, a refractive index, and an Abbe number, are not limited to the numerical values specified in the embodiments and the examples, and may be different values.

What is claimed is:

1. An objective lens for an endoscope, wherein the full angle of view of the objective lens exceeds 120 degrees, and wherein a most-object-side surface is spherical, and wherein the following condition formulas (1) and (2) are satisfied:

$$0.7 < \theta 8/\theta 10 < 0.8 \qquad (1); \text{ and}$$

$$5 < R_1/f < 15 \qquad (2),$$

where $\theta 10$: half angle of view corresponding to a maximum image height;
$\theta 8$: half angle of view corresponding to an image height that is 80% of the maximum image height;
$R_1$: curvature radius of the most-object-side surface; and
$f$: focal length of the entire system of the objective lens.

2. An endoscope comprising:
an objective lens for an endoscope, as defined in claim 1.

3. An objective lens for an endoscope, as defined in claim 1, the objective lens having 4-group/5-element structure comprising:
a negative first lens having a concave surface on the image side thereof;
a positive second lens;
a positive third lens having, on the object side thereof, a flat surface or a surface the absolute value of the curvature radius of which is greater than that of the other surface thereof; and
a cemented lens including a fourth lens and a fifth lens joined together, one of the fourth lens and the fifth lens being a positive lens and the other one of the fourth and fifth lenses being a negative lens, the cemented lens having positive refractive power as a whole group of the fourth and fifth lenses, wherein the negative first lens, the positive second lens, the positive third lens, the fourth lens and the fifth lens are arranged in order from the object side of the objective lens, and wherein a stop is arranged between the second lens and the third lens, and wherein the following condition formulas (3) and (4) are satisfied:

$$Bf/f > 2.0; \qquad (3)$$
and $$\frac{f^2 \times |\nu_4 - \nu_5|}{|R_{45}| \times (Bf + D_5/n_5)} \geq 10, \qquad (4)$$

where Bf: back focus of the entire system of the objective lens;
$\nu_4$: Abbe number of the fourth lens for d-line;
$\nu_5$: Abbe number of the fifth lens for d-line;
$R_{45}$: curvature radius of a cemented surface between the fourth lens and the fifth lens;
$D_5$: thickness of the fifth lens at the center thereof; and
$n_5$: refractive index of the fifth lens for d-line.

4. An objective lens for an endoscope, as defined in claim 3, the objective lens satisfying the following condition formula (5):

$$(\nu_2 + \nu_n) < 45 \qquad (5),$$

where $\nu_2$: Abbe number of the second lens for d-line; and
$\nu_n$: Abbe number of the negative lens included in the cemented lens for d-line.

5. An objective lens for an endoscope, as defined in claim 1, the objective lens having 4-group/6-element structure comprising:
a negative first lens having a concave surface on the image side thereof;
a first cemented lens including a second lens and a third lens joined together, one of the second lens and the third lens being a positive lens and the other one of the second and third lenses being a negative lens;
a positive fourth lens having, on the object side thereof, a flat surface or a surface the absolute value of the curvature radius of which is greater than that of the other surface thereof; and
a second cemented lens including a fifth lens and a sixth lens joined together, one of the fifth lens and the sixth lens being a positive lens and the other one of the fifth lens and the sixth lens being a negative lens, wherein the negative first lens, the second lens, the third lens, the positive fourth lens, the fifth lens and the sixth are arranged in order from the object side of the objective lens, and wherein a stop is arranged between the first cemented lens and the fourth lens, and wherein the following condition formulas (6) and (7) are satisfied:

$$Bf/f > 2.2; \qquad (6)$$
and $$\frac{f^2 \times |\nu_5 - \nu_6|}{|R_{56}| \times (Bf + D_6/n_6)} \geq 6, \qquad (7)$$

where Bf: back focus of the entire system of the objective lens;
$\nu_5$: Abbe number of the fifth lens for d-line;
$\nu_6$: Abbe number of the sixth lens for d-line;
$R_{56}$: curvature radius of a cemented surface between the fifth lens and the sixth lens;
$D_6$: thickness of the sixth lens at the center thereof; and
$n_6$: refractive index of the sixth lens for d-line.

6. An objective lens for an endoscope, as defined in claim 5, the objective lens satisfying the following condition formula (8):

$$15.0 \leq |\nu_2 - \nu_3| \qquad (8),$$

where $\nu_2$: Abbe number of the second lens for d-line; and
$\nu_3$: Abbe number of the third lens for d-line.

* * * * *